United States Patent
Miura et al.

Patent Number: 5,989,658
Date of Patent: Nov. 23, 1999

[54] JOINT ASSEMBLY AND A PROCESS FOR MANUFACTURING THE SAME AND A MOVABLE BODY AND PROCESS FOR MANUFACTURING THE SAME

[75] Inventors: Kazunori Miura; Shoichi Inaba; Eijiro Yanagisawa, all of Shizuoka, Japan

[73] Assignee: Kabushiki Kaisha Bandai, Japan

[21] Appl. No.: 08/837,900

[22] Filed: Apr. 22, 1997

[30] Foreign Application Priority Data

May 31, 1996 [JP] Japan .................................. 8-160764

[51] Int. Cl.⁶ ........................................................ F16B 2/00
[52] U.S. Cl. ............................ 428/33; 428/167; 428/172; 403/56; 403/265; 446/376; 264/241; 264/242
[58] Field of Search ...................................... 428/167, 172, 428/33, 137; 264/241, 242; 403/56, 90, 104, 265; 446/376, 381

[56] References Cited

U.S. PATENT DOCUMENTS 5,098,752  3/1992  Chang et al. ............................ 428/167

FOREIGN PATENT DOCUMENTS 50-113587  9/1975  Japan .
51-47397  4/1976  Japan .

*Primary Examiner*—Donald Loney
*Attorney, Agent, or Firm*—Graham & James LLP

[57] ABSTRACT

To provide a rotatable joint assembly in which connection is made so as to enable a click motion, a process for manufacturing such a rotatable joint assembly by molding as a unitary structure, a movable body including such a rotatable joint assembly, and a process for manufacturing such a movable body by molding as a unitary structure. A movable body 360 is formed by molding from a first synthetic resin material A in a first molding step a trunk 303 having a shoulder joint portion 305 having an outer surface on which fine protrusions are defined sequently almost its entire periphery, and a lower arm 311 having an elbow joint portion 313 having an outer surface on which fine protrusions are defined sequently almost its entire periphery, by molding from a second synthetic resin material B in a second molding step an upper arm 321 having a shoulder enclosing portion 323 enclosing the shoulder joint portion 305 of the trunk 303 as molded by the first molding step and an elbow enclosing portion 325 enclosing the elbow joint portion 313 of the lower arm 311 so as to form a unitary structure, and by molding from a third synthetic resin material C in a third molding step a covering member 361 covering the trunk and lower arms 303 and 313 as molded by the first molding step and the upper arm 321 as molded by the second molding step so as to form a unitary structure.

10 Claims, 30 Drawing Sheets

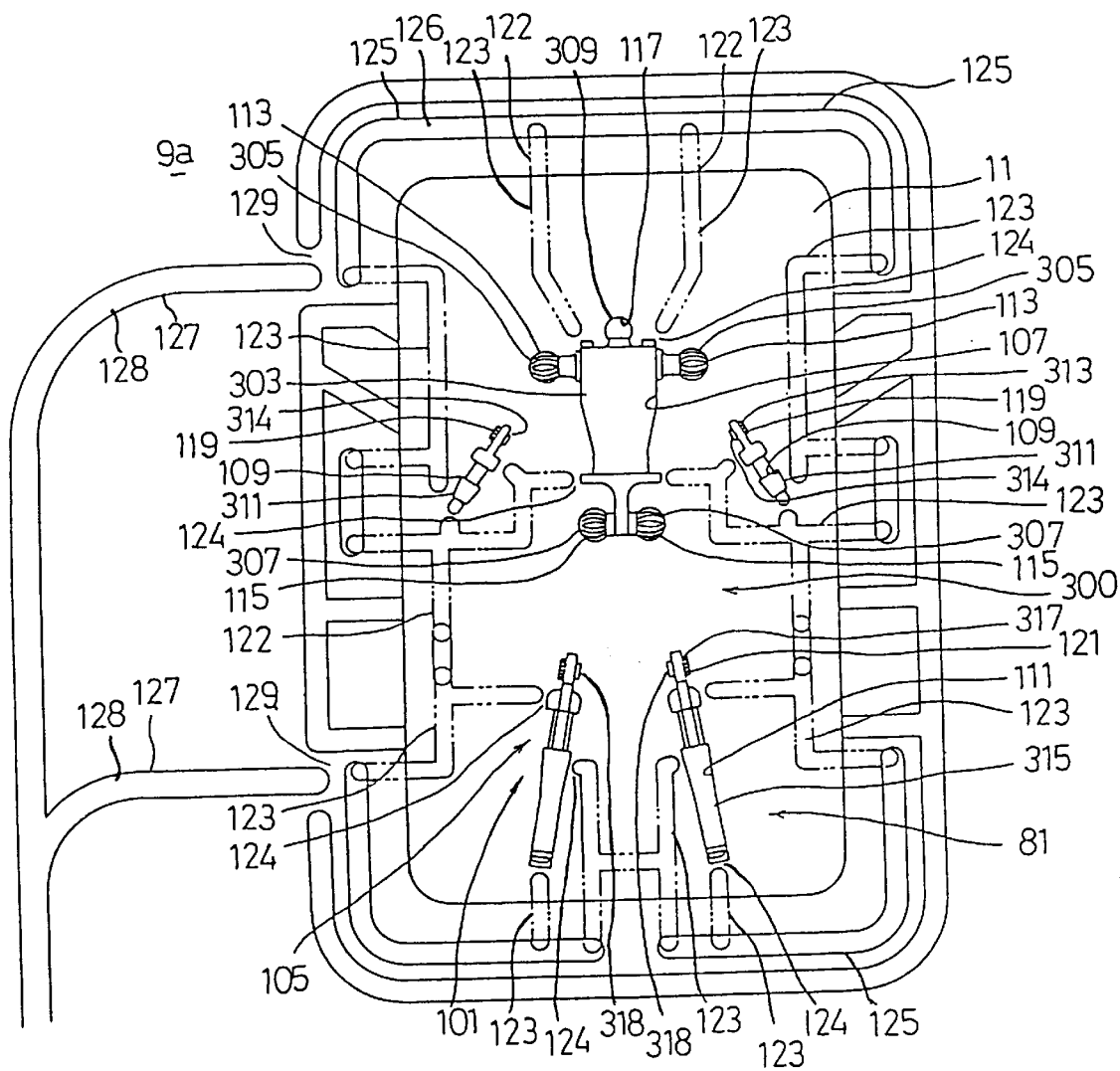
F I G. 6

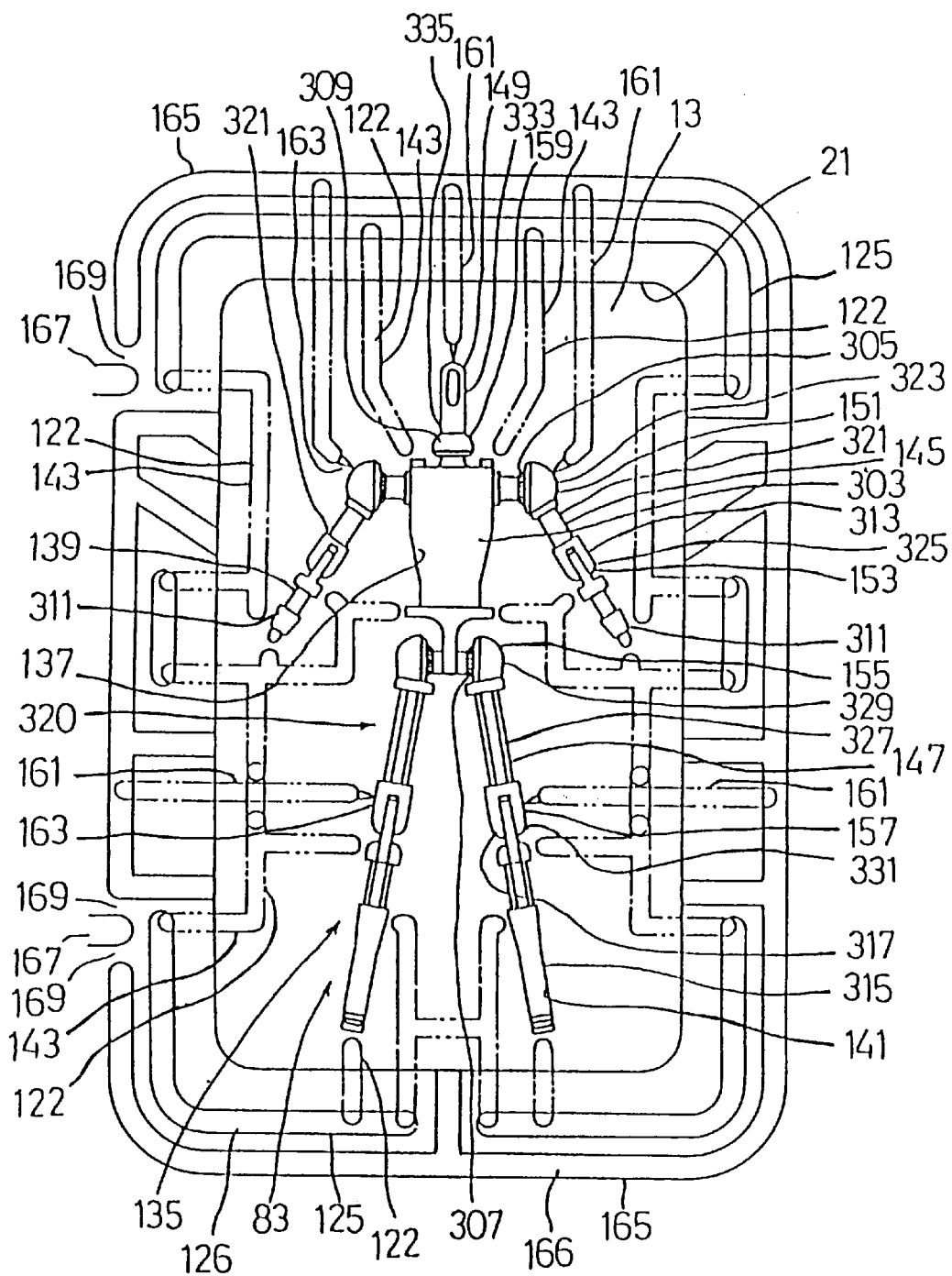
F I G. 7

JOINT ASSEMBLY AND A PROCESS FOR MANUFACTURING THE SAME AND A MOVABLE BODY AND PROCESS FOR MANUFACTURING THE SAME

BACKGROUND OF THE INVENTION

1. Field of the Invention

This invention relates to a joint assembly joined capable of a click motion and a process for manufacturing the same by molding integrally, as well as to a movable body including such joint assembly and a process for manufacturing the same by molding integrally.

2. Description of the Related Art

A known joint assembly which is capable of a click motion is described in Japanese Utility Model Application KOKAI (Laid Open) No. Sho 51-47397. It comprises a core member for the thigh, a core member for a lower leg, a rivet joining the two core members rotatably, and a leg made of soft synthetic resin for covering these parts.

The known joint assembly as described above has its core member for the thigh molded in one mold, and its core member for a lower leg molded in another mold. The core members for the thigh and a lower leg have rugged parts formed at their knee ends and enabling a click motion. The core members for the thigh and a lower leg are joined together by the rivet to form a unit in which their rugged parts engage each other. The core members for the thigh and a lower leg are placed in still another mold and a soft synthetic resin material is injected for insert molding.

There is also known a joint assembly of the type including a spherical joint, as disclosed in Japanese Utility Model Application KOKAI No. Sho 50-113587. It comprises a spherical joint portion formed at the elbow (or knee) end of an upper arm (or leg), and a spherical shell portion formed at the elbow (or knee) end of a lower arm (or leg) for fitting the spherical joint portion therein.

The known joint assembly of the type including a spherical joint enables the upper and lower arms (or legs) to stay in a flexed position owing to the tight contact between the spherical joint portion on the upper arm (or leg) and the spherical shell portion on the lower arm (or leg), as the spherical joint portion is closely fitted in the spherical shell portion by virtue of the elasticity of the material of which they are made.

It has been a drawback of the known joint assembly as described before that two expensive molds have to be made for forming the two core members for the thigh and a lower leg, respectively, in two molds. The two molds have been very difficult to make, since the rugged parts enabling a click motion have to be molded in the two molds, and since no click motion is possible unless the rugged parts molded in the two molds fit each other completely.

It has also been a drawback of the known joint assembly that it is difficult to assemble, since the core members for the thigh and a lower leg have to be joined together into a unit with the rivet, and that labor is required, and its cost of manufacture is increased, since it calls for a very difficult molding process including placing the core members for the thigh and a lower leg as joined together in still another mold, and insert molding with a soft synthetic resin material.

It has been a drawback of the joint assembly of the type including a spherical joint that it is very unstable, since the upper and lower arms (or legs) which are kept in a flexed position by the tight contact between the spherical joint and shell potions, as stated before, return to their original positions immediately if their contact become less tight. In order to overcome this drawback, attempts have been made to join the spherical joint and shell portions together in a way enabling a click motion, but it has been impossible to form a rugged part in the spherical inner surface of a spherical shell portion, and even if it may be possible, it has been impossible to fit a spherical joint portion in the spherical shell portion.

SUMMARY OF THE INVENTION

Under these circumstances, it is an object of this invention to provide a joint assembly which is capable of a click motion, a process for manufacturing such joint assembly by molding integrally, a movable body including such joint assembly and a process for manufacturing such movable body by molding integrally.

In order to solve the above problems and attain the above object, the joint assembly according to this invention comprises:

(a) a first member, and a second member connected rotatably to the first member;

(b) the first member having a joint portion molded integrally;

(c) the joint portion having an outer surface on which fine protrusions are defined sequently almost its entire periphery;

(d) the second member having a holding portion molded integrally to enclose said joint portion of said first member.

It may alternatively comprise:

(a) a first member, a second member connected rotatably to the first member, and a covering member covering the first and second members;

(b) the first member having a joint portion molded integrally;

(c) the joint portion having an outer surface on which fine protrusions are defined sequently almost its entire periphery;

(d) the second member having a holding portion molded integrally to enclose said joint portion of the first member;

(e) the covering member being molded with a soft elastic material.

In order to solve the above problems and attain the above object, the process for manufacturing a rotatable joint assembly according to this invention comprises:

(a) a first molding step for molding with a first synthetic resin material a first member having a joint portion with an outer surface on which fine protrusions are defined sequently almost its entire periphery; and (b) a second molding step for molding with a second synthetic resin material a second member having a holding portion for holding joint portion of the first member molded integrally in the first molding step.

It may alternatively comprise:

(a) a first molding step for molding with a first synthetic resin material a first member having a joint portion with an outer surface on which fine protrusions are defined sequently almost its entire periphery;

(b) a second molding step for molding with a second synthetic resin material a second member having a holding portion for holding the joint portion of the first member molded integrally in the first molding step; and (c) a third molding step for molding a covering member covering the first and second members molded integrally in the first and second molding steps with a third synthetic resin material.

The second synthetic resin material preferably has a melting point which is lower than that of the first one, while the third one has a melting point which is lower than those of the first and second ones.

In order to solve the above problems and attain the above object, the movable body according to this invention comprises:

(a) a trunk, an upper arm connected rotatably to a shoulder corner of the trunk and a lower arm connected rotatably to an elbow end of the upper arms;

(b) the trunk having a shoulder joint portion molded integrally on its shoulder corner;

(c) the lower arm having an elbow joint portion molded integrally on its elbow end;

(d) each of the shoulder and elbow joint portions having an outer surface on which fine protrusions are defined sequently almost its entire periphery;

(e) the upper arm having a shoulder holding portion enclosing the shoulder joint portion of the trunk and an elbow holding portion enclosing the elbow joint portion of the lower arm portion and molded integrally.

It may alternatively comprise:

(a) a trunk, an upper arm connected rotatably to a shoulder corner of the trunk, a lower arm connected rotatably to an elbow end of the upper arm and a covering member covering the trunk, upper arm and lower arm;

(b) the trunk having a shoulder joint portion integrally molded on its shoulder corner;

(c) the lower arm having an elbow joint portion integrally molded on its elbow end;

(d) each of the shoulder and elbow joint portions having an outer surface on which fine protrusions are defined sequently almost its entire periphery;

(e) the upper arm having a shoulder holding portion enclosing the shoulder joint portion of the trunk and an elbow holding portion enclosing the elbow joint portion of the lower arm and molded integrally;

(f) the covering member being molded integrally with a soft elastic material.

In order to solve the above problems and attain the above object, the movable body according to this invention comprises:

(a) a trunk, an upper leg connected rotatably to a crotch corner of the trunk and a lower leg connected rotatably to a knee end of the upper leg;

(b) the trunk having a crotch joint portion molded integrally on its crotch corner;

(c) the lower leg having a knee joint portion molded integrally on its knee end;

(d) each of the crotch and knee joint portions having an outer surface on which fine protrusions are defined sequently almost its entire periphery;

(e) the upper leg having a crotch holding portion enclosing the crotch joint portion of the trunk and knee holding portion enclosing the knee joint portion of the lower leg and molded integrally.

It may alternatively comprise:

(a) a trunk, an upper leg connected rotatably to a crotch corner of the trunk, a lower leg connected rotatably to a knee end of the upper leg and a covering member covering the trunk, upper leg and lower leg;

(b) the trunk portion having a crotch joint portion integrally molded on its crotch corner;

(c) the lower leg having a knee joint portion integrally molded on its knee end;

(d) each of the crotch and knee joint portions having an outer surface on which fine protrusions are defined sequently almost its entire periphery;

(e) the upper leg having a crotch holding portion enclosing the crotch joint portion of the trunk and a knee holding portion enclosing the knee joint portion of the lower leg and molded integrally;

(f) the covering member being molded integrally with a soft elastic material.

In order to solve the above problems and attain the above object, the process for manufacturing a movable body according to this invention comprises:

(a) a first molding step for integrally molding with a first synthetic resin material a trunk having a shoulder joint portion having an outer surface on which fine protrusions are defined sequently almost its entire periphery and a lower arm having an elbow joint portion having an outer surface on which fine protrusions are defined sequently almost its entire periphery; and (b) a second molding step for integrally molding with a second synthetic resin material an upper arm having a shoulder holding portion enclosing the shoulder joint portion of the trunk and an elbow holding portion enclosing the elbow joint portion of the lower arm molded by the first molding step.

It may alternatively comprise:

(a) a first molding step for integrally molding with a first synthetic resin material a trunk having a shoulder joint portion having an outer surface on which fine protrusions are defined sequently almost its entire periphery and a lower arm having an elbow joint portion having an outer surface on which fine protrusions are defined sequently almost its entire periphery;

(b) a second molding step for integrally molding with a second synthetic resin material an upper arm having a shoulder holding portion enclosing the shoulder joint portion of the trunk and an elbow holding portion enclosing the elbow joint portion of the lower arm; and (c) a third molding step for integrally molding a covering member covering the trunk and lower arm molded by the first molding step and upper arm molded integrally by the second molding step with a third synthetic resin material.

In order to solve the above problems and attain the above object, the process for manufacturing a movable body according to this invention comprises:

(a) a first molding step for integrally molding with a first synthetic resin material a trunk having a crotch joint portion having an outer surface on which fine protrusions are defined sequently almost its entire periphery and a lower leg having a knee joint portion having an outer surface on which fine protrusions are defined sequently almost its entire periphery; and (b) a second molding step for integrally molding with a second synthetic resin material an upper leg having a crotch holding portion enclosing the crotch joint portion of the trunk and a knee holding portion enclosing the knee joint portion of the lower leg.

It may alternatively comprise:

(a) a first molding step for integrally molding with a first synthetic resin material a trunk having a crotch joint portion having an outer surface on which fine protrusions are defined sequently almost its entire periphery and a lower leg having a knee joint portion having an outer surface on which fine protrusions are defined sequently almost its entire periphery;

(b) a second molding step for integrally molding with a second synthetic resin material an upper leg having a crotch holding portion enclosing the crotch joint portion of the trunk and a knee holding portion enclosing the knee joint portion of the lower leg molded by the first molding step; and (c) a third molding step for integrally molding with a covering member covering the trunk and lower leg molded by the first molding step and upper leg molded integrally by the second molding step with a third synthetic resin material.

The second synthetic resin material preferably has a melting point which is lower than that of the first one, while the third one has a melting point which is lower than those of the first and second ones.

BRIEF DESCRIPTION OF THE DRAWINGS

FIG. 6 is a top plan view showing a primary mold in the molding apparatus;

FIG. 7 is a top plan view showing a secondary mold in the molding apparatus;

DETAILED DESCRIPTION OF THE PREFERRED EMBODIMENTS

Figure 1:
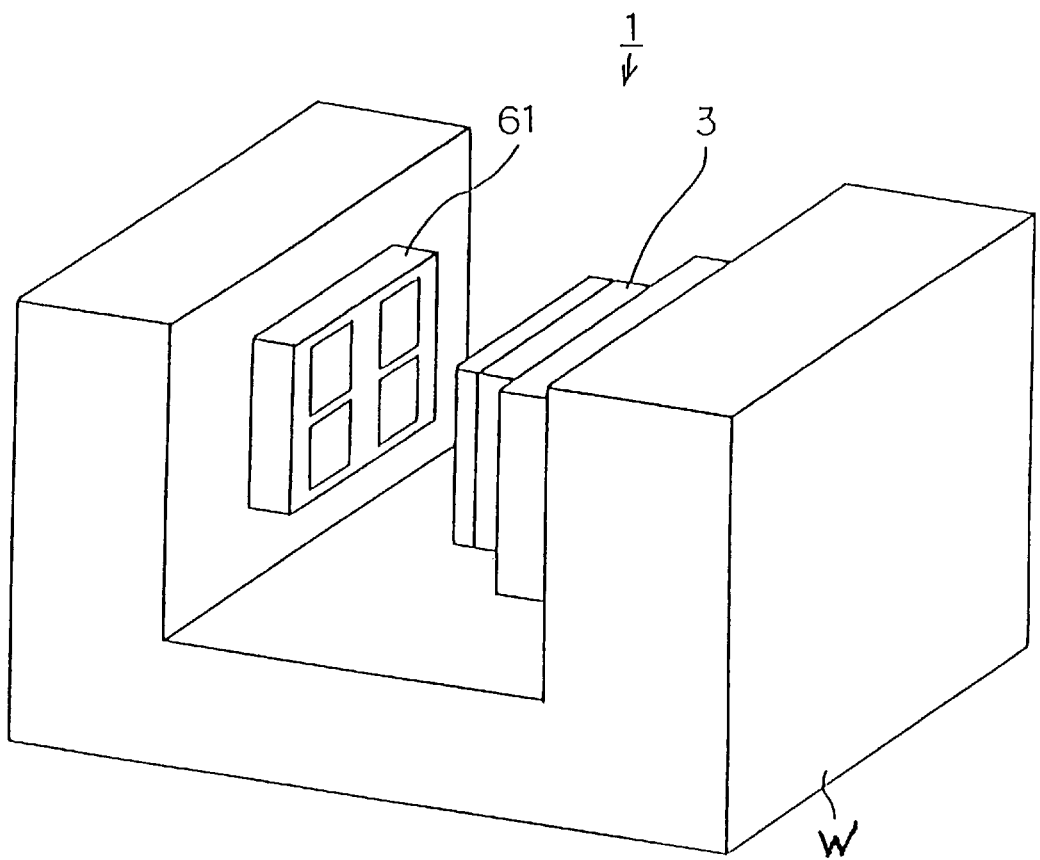
FIG. 1 is an overall perspective view showing a molding apparatus relating to an embodiment of this invention as installed in an injection molding apparatus.

A joint assembly embodying this invention will be described with reference to drawings.

The joint assembly comprises a first member and a second member connected rotatably to the first member. The first member comprises a trunk portion 303, or a lower arm 311, or a lower leg 315. The second member comprises an upper arm 321, or an upper leg 327.

The first member, namely, the trunk 303, the lower arm 311 or lower leg 315 is molded as a unit having a joint portion. The joint portion has an outer surface on which fine protrusions are defined sequently almost its entire periphery. The joint portion is a generally spherical or polygonal joint 305 or 307 of the trunk portion 303, a protruding shaft 313 of the lower arm 311, or a protruding shaft 317 of the lower leg 315. The protruding shaft 313 or 317 can be molded on one or both sides of the lower arm 311 or lower leg 315.

The second member, namely, the upper arm 321 or upper leg 327 is molded as a unit having an holding portion enclosing the joint portion, namely, the generally spherical or polygonal joint 305 or 307, or the protruding shaft 313 or 317, of the first member, namely, the trunk 303, the lower arm 311 or lower leg 315. The holding portion is a shell 323 or a bearing 325 of the upper arm 321, or a shell 329 or a bearing 331 of the upper leg 327.

In the joint assembly as described above, therefore, the second member, namely, the upper arm 321 or upper leg 327 is rotatably connected to the first member, namely, the trunk 303. Likewise, the second member, namely, the upper arm 321 is rotatably connected to the first member, namely, the lower arm 311, and the second member, namely, the upper leg 327 is rotatably connected to the first member, namely, the lower leg 315.

As stated above, the joint portion, namely, the generally spherical or polygonal joint 305 or 307, or the protruding shaft 313 or 317 of the first member, namely, the trunk 303, the lower arm 311 or lower leg 315 has an outer surface on which fine protrusions are defined sequently almost its entire periphery, and the second member, namely, the upper arm 321 or upper leg 327 is molded as a unit having an holding portion, namely, the shell 323 or 329, or the bearing 325 or 331 enclosing the generally spherical or polygonal joint 305 or 307, or the protruding shaft 313 or 317, and the shells 323 and 329, and the bearings 325 and 331 have, therefore, an inner surface which is finely rugged sequently almost its entire periphery.

Therefore, the second member, namely, the upper arm 321 or upper leg 327 is rotatable with a click relative to the first member, namely, the trunk 303. Likewise, the second member, namely, the upper arm 321 is rotatable with a click relative to the first member, namely, the lower arm 311, and the second member, namely, the upper leg 327 is rotatable with a click relative to the first member, namely, the lower leg 315. This click motion relies upon the elasticity of the material of the first and second members and is made with the flexing of one or both of them.

The joint assembly may alternatively comprise a first member, a second member connected rotatably to the first member and a covering member 361 covering the first and second members. The covering member 361 is molded integrally with a soft elastic material, so that the upper arm 321 or upper leg 327 as the second member may be rotatable with a click relative to the trunk 303 as the first member, while the second member, namely, the upper arm 321 is rotatable with a click relative to the first member, namely, the lower arm 311.

The joint assembly as described above can be made by employing a first molding step comprising molding integrally with a first synthetic resin material a first member having a joint portion having an outer surface on which fine protrusions are defined sequently almost its entire periphery, and a second molding step comprising molding integrally with a second synthetic resin material a second member having a holding portion enclosing the joint portion of the first member.

More specifically, the first molding step is employed for molding integrally with the first synthetic resin material A the first member, namely, the trunk 303 having the joint portion, namely, the generally spherical or polygonal joint 305 or 307 having an outer surface on which fine protrusions are defined sequently almost its entire periphery, or the lower arm 311 or lower leg 315 having the joint portion, namely, the protruding shaft 313 or 317 having an outer surface on which fine protrusions are defined sequently almost its entire periphery.

The second molding step is employed for molding integrally with the second synthetic resin material B the upper arm 321 (second member) having the shell 323, or bearing 325, or the upper leg 327 (second member) having the shell 329, or bearing 331, as the holding portion enclosing the joint portion, namely, the generally spherical or polygonal joint 305 or 307, or the protruding shaft 313 or 317, of the first member, namely, the trunk 303, the lower arm 311 or lower leg 315, as molded by the first molding step.

A third molding step is employed for molding integrally with a third synthetic resin material C the covering member 361 covering the first and second members molded as a unit by the second molding step, i.e. the trunk 303 and the upper arm 321 or upper leg 327, or the lower arm 311 and upper arm 321, or the lower leg 315 and upper leg 327.

The second synthetic resin material B preferably has a melting point which is lower than that of the first synthetic resin material A, while the melting point of the third one C is lower than those of the first and second ones A and B, so that the members molded by the successive molding steps may not get welded to each other.

A movable body 360 comprises a trunk 303, an upper arm 321 connected rotatably to the shoulder of the trunk 303 and a lower arm 311 connected rotatably to the elbow of the upper arm 321. The trunk 303 has a shoulder joint 305 formed on its shoulder. The lower arm 311 has an elbow joint 313 formed at its elbow end. Each of the shoulder and elbow joints 305 and 313 has an outer surface on which fine protrusions are defined sequently almost its entire periphery.

The upper arm 321 has a shoulder holding portion 323 enclosing the shoulder joint 305 of the trunk 303 and an elbow holding portion 325 enclosing the elbow joint 313 of the lower arm 311.

The movable body 360 may further include a covering member 361 covering the trunk 303, upper arm 321 and lower arm 311. The covering member 361 is molded integrally with a soft elastic material.

Another movable body 360 comprises a trunk 303, an upper leg 327 connected rotatably to the crotch end of the trunk 303 and a lower leg 315 connected rotatably to a knee end of the upper leg 327. The trunk 303 has a crotch joint 307 formed at its crotch end. The lower leg 315 has a knee joint 317 formed at its knee end. Each of the crotch and knee joints 307 and 317 has an outer surface on which fine protrusions are defined sequently almost its entire periphery. The upper leg 327 has a crotch holding portion 329 enclosing the crotch joint 307 of the trunk and knee holding portion 331 enclosing the knee joint 317 of the lower arm 315.

The movable body 360 may further include a covering member 361 covering the trunk 303, upper leg 327 and lower leg 315. The covering member 361 is molded with a soft elastic material.

The movable body 360 can be manufactured by employing a first molding step comprising molding with a first synthetic resin material A a trunk 303 having a shoulder joint 305 having outer surface on which fine protrusions are defined sequently almost its entire periphery, and a lower arm 311 having an elbow joint 313 having an outer surface on which fine protrusions are defined sequently almost its entire periphery, and a second molding step comprising molding integrally with a second synthetic resin material B an upper arm 321 having a shoulder holding portion 323 enclosing the shoulder joint 305 of the trunk 303 molded by the first molding step and an elbow holding portion 325 holding the elbow joint 313 of the lower arm 311.

The movable body 360 can also be manufactured by employing a first molding step comprising molding with a first synthetic resin material A a trunk 303 having a shoulder joint 305 having an outer surface on which fine protrusions are defined sequently almost its entire periphery, and a lower arm 311 having an elbow joint 313 having an outer surface on which fine protrusions are defined sequently almost its entire periphery, a second molding step comprising molding with a second synthetic resin material B an upper arm 321 having a shoulder holding portion 323 enclosing the shoulder joint 305 of the trunk 303 molded by the first molding step and an elbow holding portion 325 enclosing the elbow joint 313 of the lower arm 311, and a third molding step comprising molding integrally with a third synthetic resin material C a covering member 361 covering the trunk 303 and lower arm 311 molded by the first molding step and the upper arm 321 molded integrally by the second molding step.

The movable body 360 can also be manufactured by employing a first molding step comprising molding with a first synthetic resin material A a trunk 303 having a crotch joint 307 having an outer surface on which fine protrusions are defined sequently almost its entire periphery, and a lower leg 315 having a knee joint 317 having an outer surface on which fine protrusions are defined sequently almost its entire periphery, and a second molding step comprising molding integrally with a second synthetic resin material B an upper leg 327 having a crotch holding portion 329 enclosing the crotch joint 307 of the trunk 303 molded by the first molding step and a knee enclosing portion 331 holding the knee joint 317 of the lower leg 315.

The movable body 360 can also be manufactured by employing a first molding step comprising molding with a first synthetic resin material A a trunk 303 having a crotch joint 307 having an outer surface on which fine protrusions are defined sequently almost its entire periphery, and a lower leg 315 having a knee joint 317 having an outer surface on which fine protrusions are defined sequently almost its entire periphery, a second molding step comprising molding integrally with a second synthetic resin material B an upper leg 327 having a crotch holding portion 329 enclosing the crotch joint 307 of the trunk 303 molded by the first molding step and a knee holding portion 331 enclosing the knee joint 317 of the lower leg 315, and a third molding step comprising molding integrally with a third synthetic resin material C a covering member 361 covering the trunk 303 and lower leg 315 molded by the first molding step and the upper leg 327 molded integrally by the second molding step.

The second synthetic resin material B preferably has a melting point which is lower than that of the first synthetic resin material A, while the melting point of the third synthetic resin material C is lower than those of the first and second ones A and B, so that the members molded by the respective molding step may not get welded to each other.

Description will now be made on a preferred embodiment of this invention.

A molding apparatus 1 comprises a movable mold device 3 and a stationary mold device 61 carried on the movable and stationary sides, respectively, of a known injection molding machine W, as shown in FIG. 1.

Figure 2:
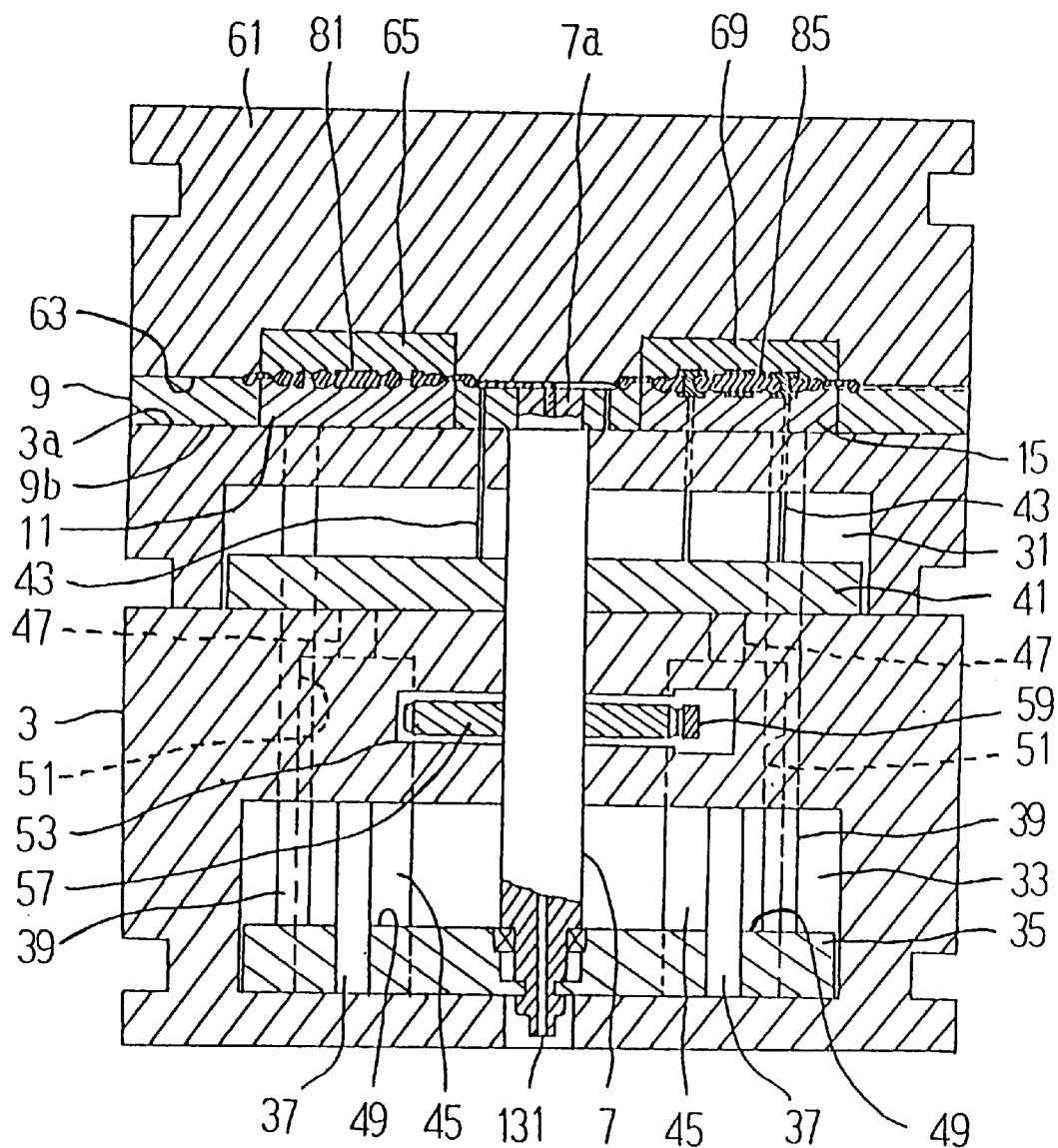
FIG. 2 is a side elevational view of the molding apparatus.
Figure 3:
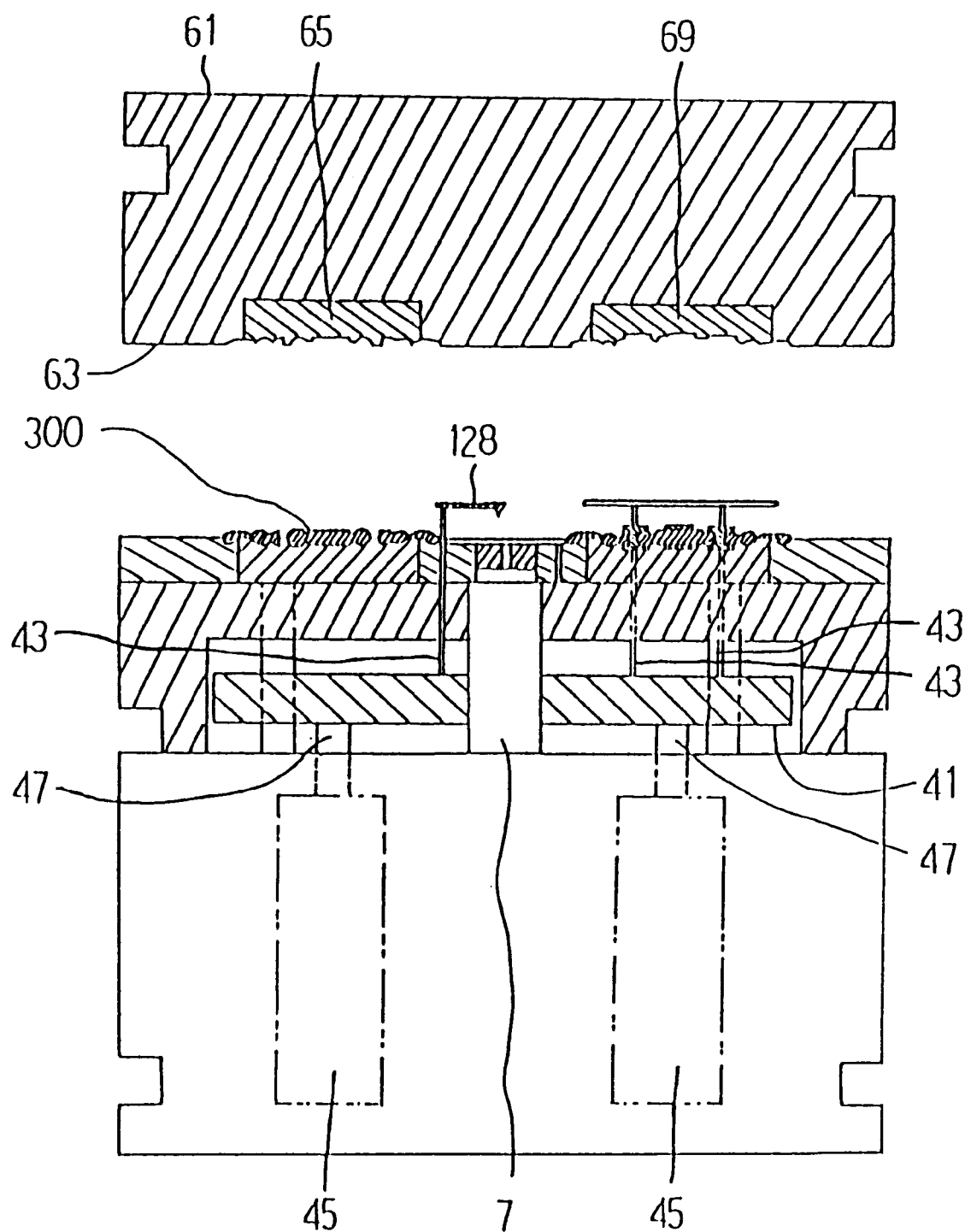
FIG. 3 is an overall and partly omitted side elevational view of the molding apparatus in its open position.
Figure 4:
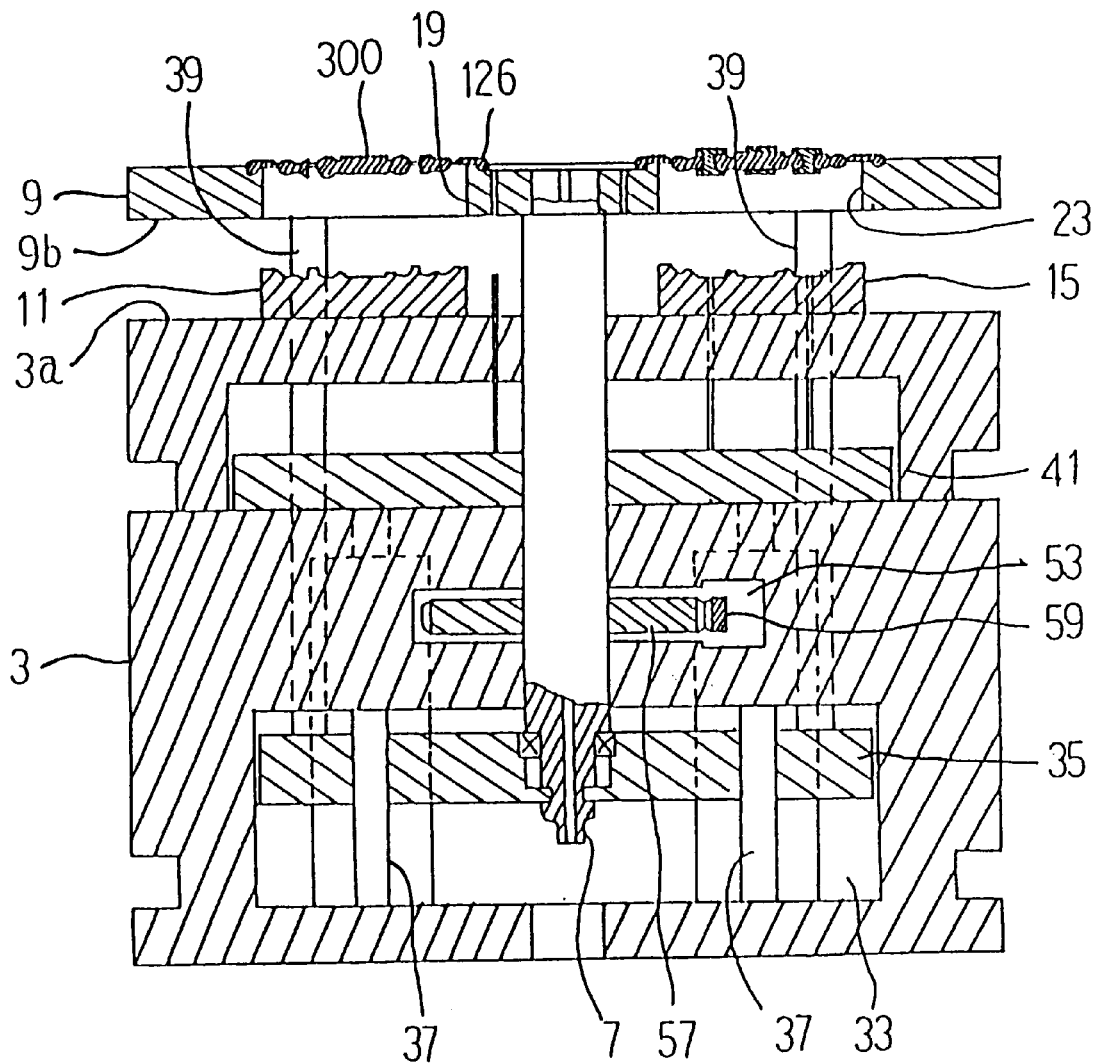
FIG. 4 is an overall and partly omitted side elevational view illustrating the operation of the molding apparatus.

A rotary shaft 7 extends through approximately the center of the movable mold device 3 rotatably and axially slidably, as shown in FIGS. 2 to 4. The rotary shaft 7 has at its front end an extension 7a about which a rotary table 9 is secured.

Figure 5:
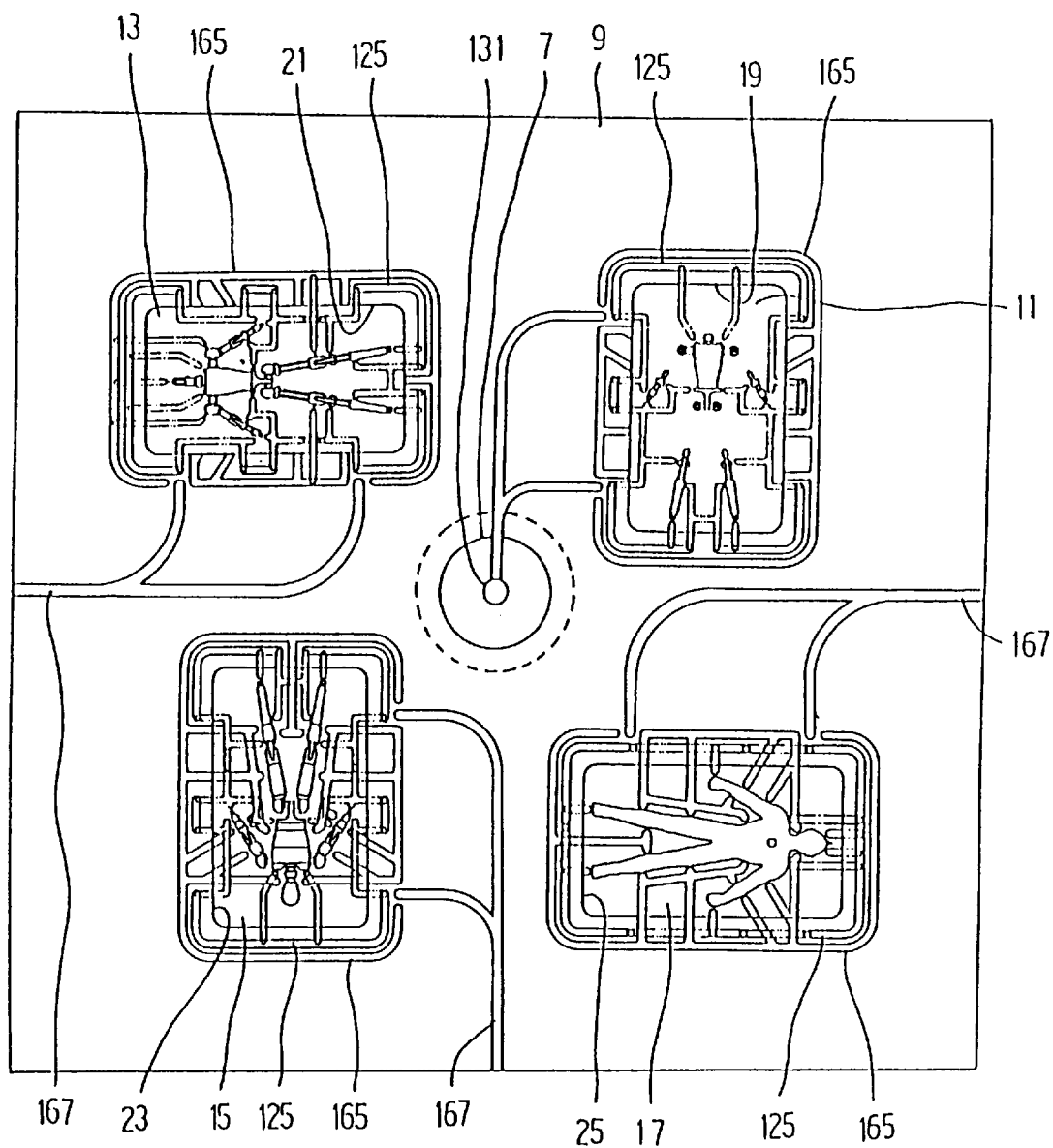
FIG. 5 is a top plan view of a movable mold device in the molding apparatus.

The movable mold device 3 has a front surface 3a to which a first movable mold portion 11 for molding a primary product 300, a second movable mold portion 13 for molding a secondary product 320, a third movable mold portion 15 for molding a tertiary product 340 and a fourth movable mold portion 17 for molding a quaternary (or final) product 360 are secured by bolts, etc. at intervals of about 90 degrees about the rotary shaft 7, as shown in FIG. 5. The movable mold portions 11, 13, 15 and 17 are of the same dimensions except those of the recesses which they define, as will later be described.

The rotary table 9 has a rear surface 9b which can be joined with the front surface 3a of the movable mold device 3. The rotary table 9 has apertures 19, 21, 23 and 25 in which the movable mold portions 11, 13, 15 and 17 can respectively be fitted snugly.

The movable mold device 3 has a front chamber 31 and a rear chamber 33. The rear chamber 33 contains a first base 35 which is slidable along guide pins 37. The rotary shaft 7 has a rear end supported rotatably by a bearing in the first base 35. Pusher shafts 39 connected to the rear surface 9b of the rotary table 9 for pushing it forward extend through the movable mold device 3 and have their rear ends secured to the first base 35.

The front chamber 31 contains a second base 41 which is movable back and forth. A plurality of ejector pins 43 are secured at their rear ends to the second base 41 for ejecting molded products and runners forward, as will be described later. A pair of hydraulic cylinders 45 are installed in the rear chamber 33 and each of them having a drive shaft 47 to which the second base 41 is attached. The hydraulic cylinders 45 are supported at their rear ends in holes 49 formed in the first base 35 and at their front ends in recesses 51 formed in the front wall of the rear chamber 33.

The movable mold device 3 also has an intermediate chamber 53 formed in its substantially middle portion. The intermediate chamber 53 houses a spur gear 57 connected rotatably to the rotary shaft 7 by a spline key not shown, and meshing with a rack 59 connected to the drive rod of a hydraulic cylinder (not shown) secured to the movable mold device 3.

The stationary mold device 61 has a front surface 63 facing the movable mold device 3, and provided with a first stationary mold portion 65 joinable with the first movable mold portion 11 to define a primary mold 81, a second stationary mold portion 67 joinable with the second movable mold portion 13 to define a secondary mold 83, a third stationary mold portion 69 joinable with the third movable mold portion 15 to define a tertiary mold 85 and a fourth stationary mold portion 71 joinable with the fourth movable mold portion 17 to define a quaternary mold 87.

Figure 11:
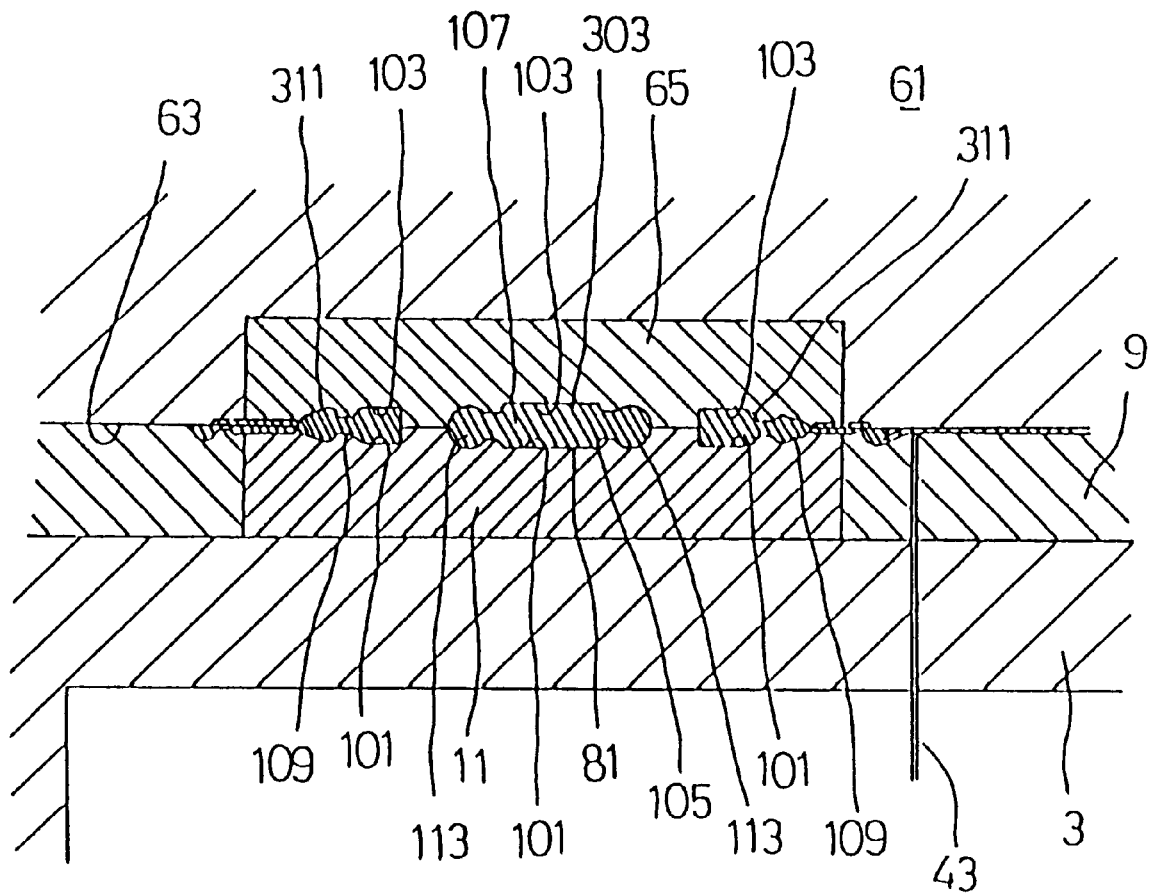
FIG. 11 is a fragmentary sectional view of the primary mold.
Figure 12:
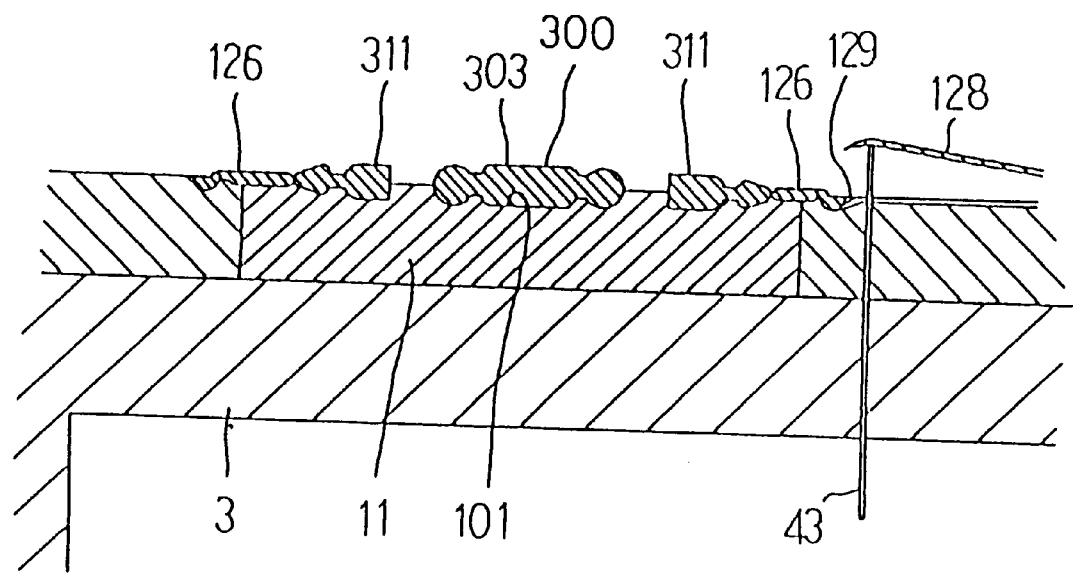
FIG. 12 is a fragmentary sectional view illustrating the operation of the primary mold.

The first movable mold portion 11 has a first movable mold recess 101 formed on its surface, while the first stationary mold portion 65 has a first stationary mold recess 103 formed in its surface, as shown in FIGS. 6, 11 and 12. The first movable and stationary mold recesses 101 and 103 define a primary mold cavity 105 in the primary mold 81 formed by the first movable and stationary mold portions 11 and 65 joined together, so that a primary product 300 may be molded in the primary mold cavity 105.

The primary mold cavity 105 has a trunk cavity 107 for molding the trunk 303, lower arm cavities 109 for molding the lower arms 311 and a lower leg cavities 111 for molding the lower legs 315.

Shoulder joint cavities 113 for molding generally spherical or polygonal joint portions 305 each having a substantially polygonal cross section (or an outer surface on which fine protrusions are defined sequently almost its entire periphery) are formed in the positions corresponding to the shoulder portions of the trunk cavity 107. Crotch joint cavities 115 for molding generally spherical or polygonal joint portions 307 each having a substantially polygonal cross section (or an outer surface on which fine protrusions are defined sequently almost its entire periphery) are formed in the positions corresponding to the crotch portions of the trunk cavity 107. A neck joint cavity 117 for molding a smoothly spherical joint portion 309 is formed in the position corresponding to the neck portion of the trunk cavity 107.

Elbow joint cavities 119 for molding protruding shafts 313 each having a substantially polygonal cross section (or an outer surface on which fine protrusions are defined sequently almost its entire periphery) on one side and supporting shafts 314 each having a circular cross section on the other side is formed in the positions corresponding to the elbow portions of the lower arm cavities 109. Knee joint cavities 121 for molding a protruding shafts 317 each having a substantially polygonal cross section (or an outer surface on which fine protrusions are defined sequently almost its entire periphery) on one side and a supporting shafts 318 each having a circular cross section on the other side are formed in the positions corresponding to the knee portions of the lower leg cavities 111.

The first stationary mold portion 65 has runner channels 123 formed on its front surface for supplying a first synthetic resin material A into the trunk, lower arm and lower leg cavities 107, 109 and 111 through gates 124. The rotary table 9 has on its front surface 9a runner channels 125 surrounding the first movable mold portion 11 and connected with the runner channels 123. The runner channels 125 are also connected with runner channels 127 through tunnel gates 129 and the runner channels 127 are connected with material supply passage 131 formed in the rotary shaft 7 and extending from its rear to its front end.

Figure 15:
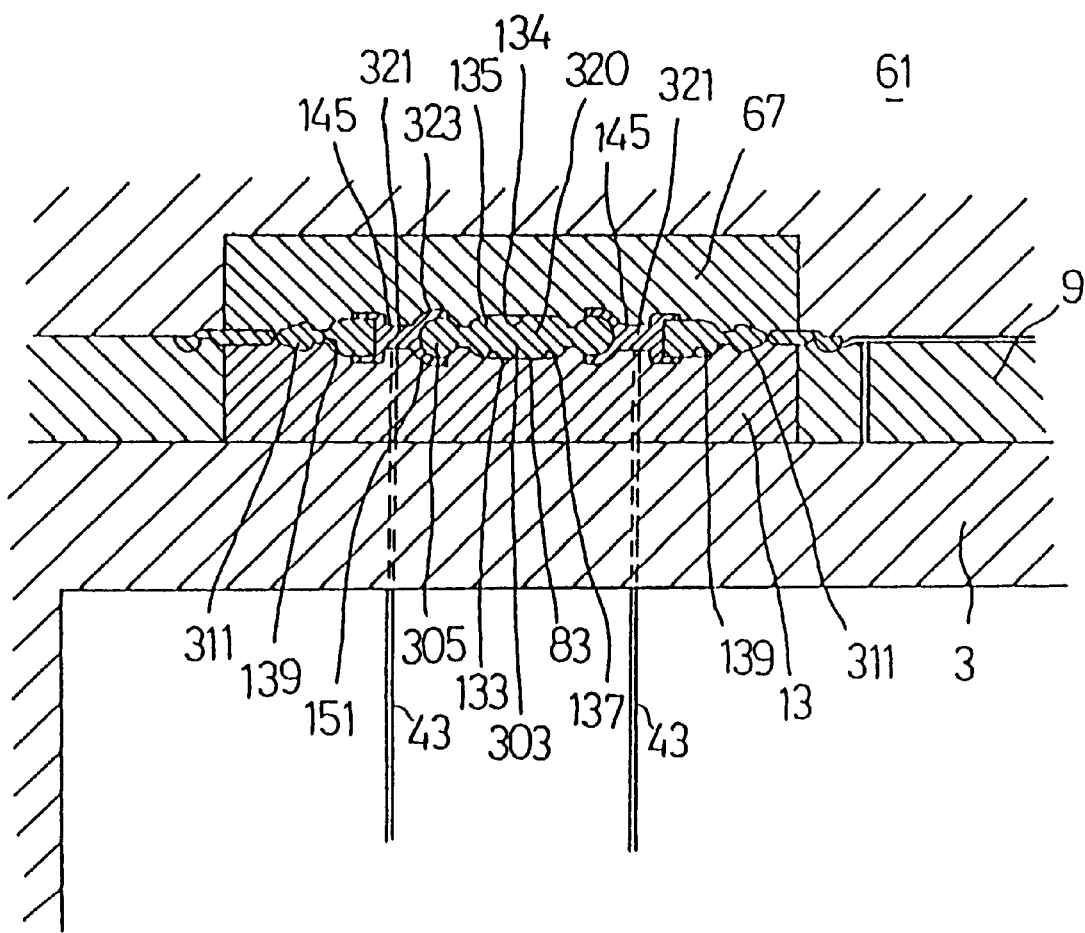
FIG. 15 is a fragmentary sectional view of the secondary mold.

The second movable mold portion 13 has a second movable mold recess 133 formed on its front surface, while the second stationary mold portion 67 has a second stationary mold recess 134, as shown in FIGS. 7 and 15. The second movable and stationary mold recesses 133 and 134 define a secondary mold cavity 135 for molding a secondary product 320 in the secondary mold 83 formed by the second movable and stationary mold portions 13 and 67 joined together.

The secondary mold cavity 135 has a trunk securing cavity 137 for mounting and securing the trunk 303 molded in the primary mold 81, and lower arm securing cavities 139 and lower leg securing cavities 141 for mounting and securing the lower arm and leg 311 and 315 molded in the primary mold 81. The front surface 63 of the stationary mold device 61 and the front surface of the second stationary mold portion 67 have runner securing channels 143 for mounting and securing the runners 122 molded in the runner channels 123.

The secondary mold cavity 135 also has upper arm cavities 145 for molding the upper arms 321, upper leg cavities 147 for molding the upper legs 327 and a skull cavity 149 for molding the skull 333. The cavity 135 also has shell cavities 151 connected to the shoulder end of the upper arm cavities 145 for molding shells 323 for inserting the generally spherical or polygonal joint portions 305 molded in the primary mold 81. It also has a bearing cavities 153 connected to the elbow ends of the upper arm cavities 145 for molding bearings 325 for inserting the protruding shafts 313 and the supporting shafts 314 molded in the primary mold 81.

A shell cavities 155 for molding shells 329 for inserting the generally spherical or polygonal joint portions 307 molded in the primary mold 81 are formed at the crotch joint ends of the upper leg cavities 147. A bearing cavities 157 for molding bearings 331 for inserting the protruding and supporting shafts 317 and 318 molded in the primary mold 81 are formed at the knee ends of the upper leg cavities 147. A shell cavity 159 for molding a shell 335 for inserting the generally spherical or polygonal joint portion 309 molded in the primary mold 81 is formed at the neck end of the skull cavity 149.

The second stationary mold portion 67 has runner channels 161 formed on its front surface for supplying a second synthetic resin material B into the upper arm, upper leg and skull cavities 145, 147 and 149 through tunnel gates 163 formed in the second movable mold portion 13. The runner channels 161 are connected with runner channels 165 formed around the runner channels 125 in the rotary table 9. The runner channel 165 is connected with runner channels 167 through tunnel gates 169, and the runner channels 167 are connected with an injection unit (not shown) in the injection molding machine W connected to the movable or stationary mold device 3 or 61.

Figure 8:
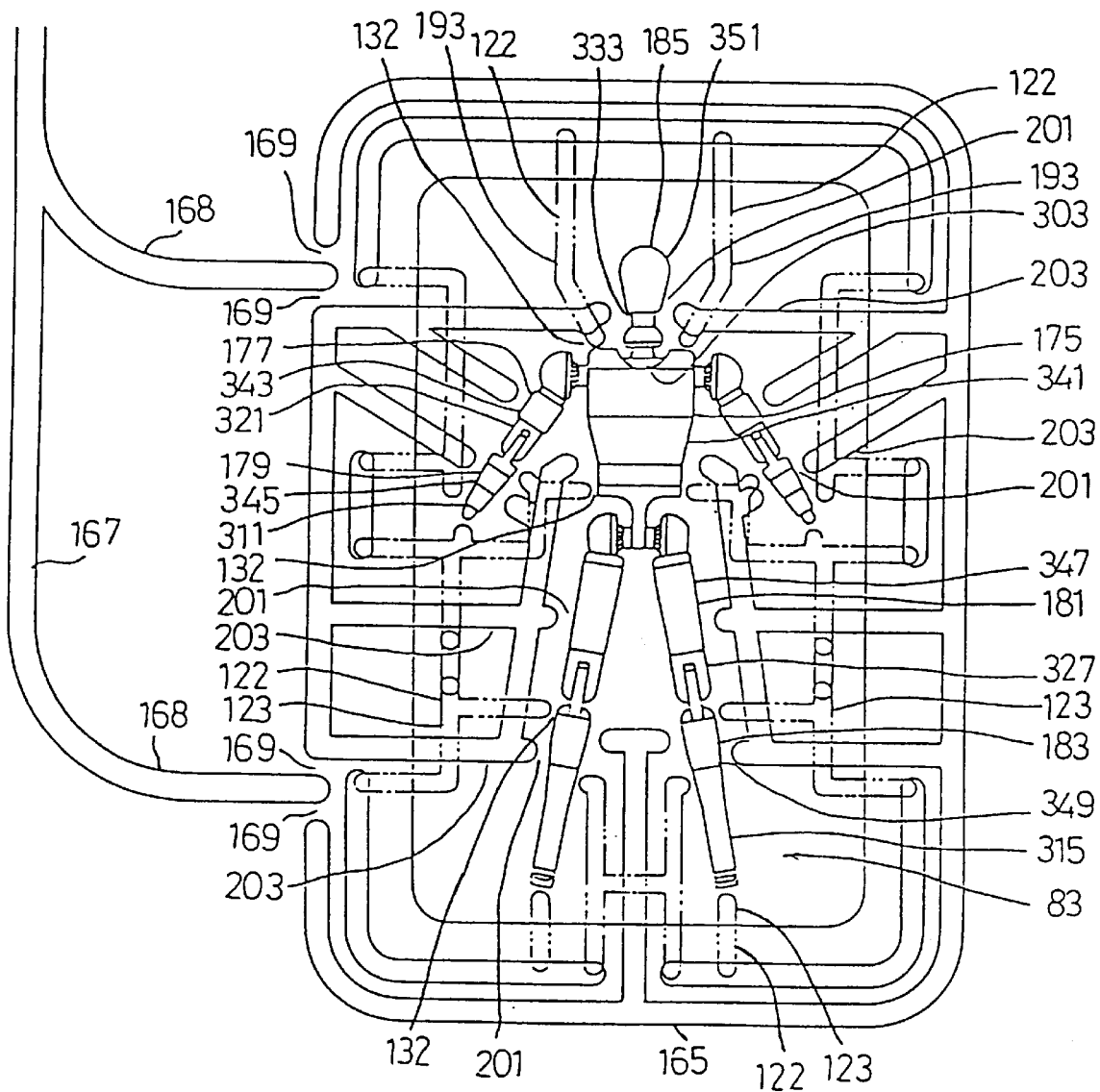
FIG. 8 is a top plan view showing a tertiary mold in the molding apparatus.
Figure 20:
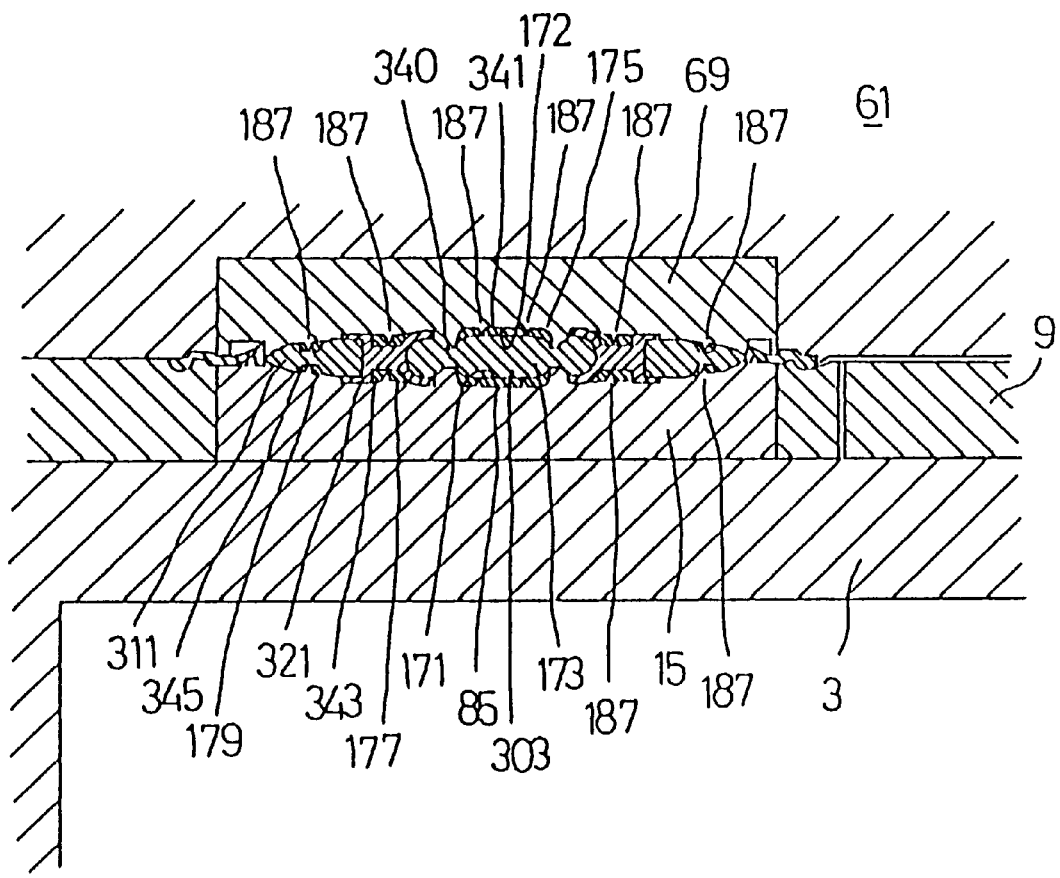
FIG. 20 is a fragmentary sectional view of the tertiary mold.
Figure 21:
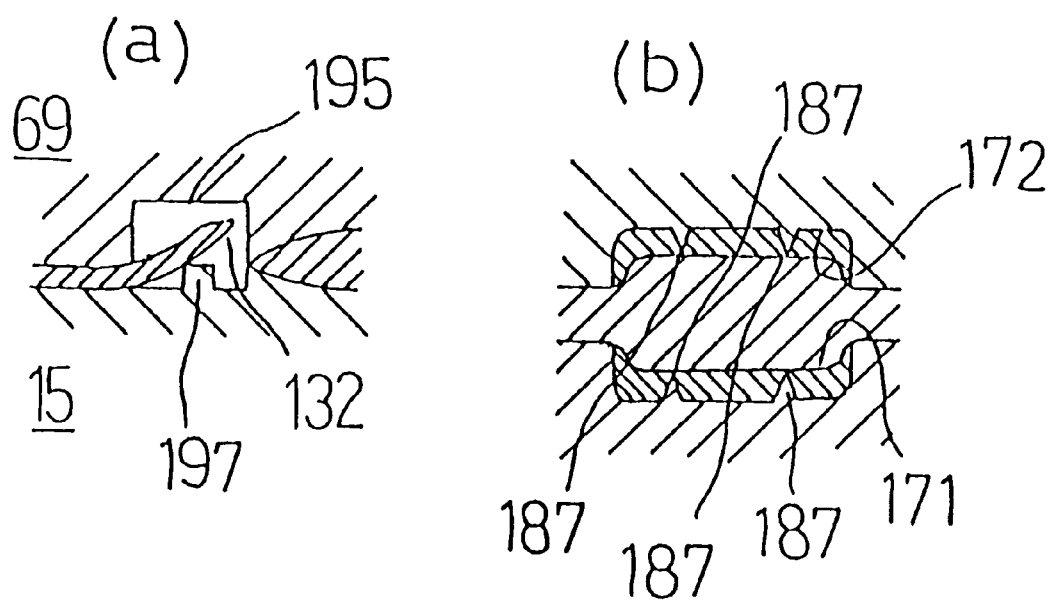
FIG. 21 is a fragmentary enlarged sectional view of the tertiary mold.

The third movable mold portion 15 has a third movable mold recess 171 formed on its front surface, while the third stationary mold portion 69 has a third stationary mold recess 172 formed on its front surface, as shown in FIGS. 8, 20 and (b) of FIG. 21. The third movable and stationary mold recesses 171 and 172 define a tertiary mold cavity 173 for molding a tertiary product 340 when the tertiary mold 85 formed by the third movable and stationary mold portions 15 and 69 joined together.

The tertiary mold cavity 173 has a trunk flesh cavity 175 for molding the trunk flesh portion 341 by insert molding about the trunk portion 303, upper arm flesh cavities 177 for molding the upper arm flesh portions 343 by insert molding about the upper arm 321 and lower arm flesh cavities 179 for molding the lower arm flesh portions 345 by insert molding about the lower arms 311. The cavity 173 also has upper leg flesh cavities 181 for molding the upper leg flesh portions 347 by insert molding about the upper legs 327, lower leg flesh cavities 183 for molding the lower leg flesh portions 349 by insert molding about the lower legs 315 and a skull flesh cavity 185 for molding the skull flesh portion 351 by insert molding about the skull portion 333.

Protrusions 187 extending to the vicinity of the trunk 303, upper arms 321, lower arms 311, upper legs 327 and lower legs 315 are formed as integral or separate parts in the third movable mold recess 171 of the third movable mold portion 15 and the third stationary mold recess 172 of the third stationary mold portion 69. Therefore, the protrusions 187 form engaging holes 191 in the trunk flesh portion 341 molded in the trunk flesh cavity 175, the upper arm flesh portions 343 molded in the upper arm flesh cavities 177, the lower arm flesh portions 345 molded in the lower arm flesh cavities 179, the upper leg flesh portions 347 molded in the upper leg flesh cavities 181 and the lower leg flesh portions 349 molded in the lower leg flesh cavities 183.

The third stationary mold portion 69 has runner securing channels 193 formed on its front surface for mounting and securing the runners 122 molded in the runner channels 123. The runner channels 193 have recesses 195 for receiving the connecting ends 132 of the runners 122 which are molded at the gates 124 of the runner channels 123. The third movable mold portion 15 has pressing protrusions 197 formed as integral or separate parts on its front surface for cutting off the connecting ends 132 of the runners 122 and forcing them into the recesses 195.

The third movable mold portion 15 has runner channels 203 formed on its front surface for supplying a fourth synthetic resin material D into the flesh cavities 175, 177, 179, 181 and 183 through gates 201. The runner channels 203 are connected to the runner channel 165 in the rotary table 9, which is in turn connected through the tunnel gates 169 to the runner channel 167 which is connected to the injection unit (not shown) of the injection molding machine W connected to the movable or stationary mold device 3 or 61.

Figure 9:
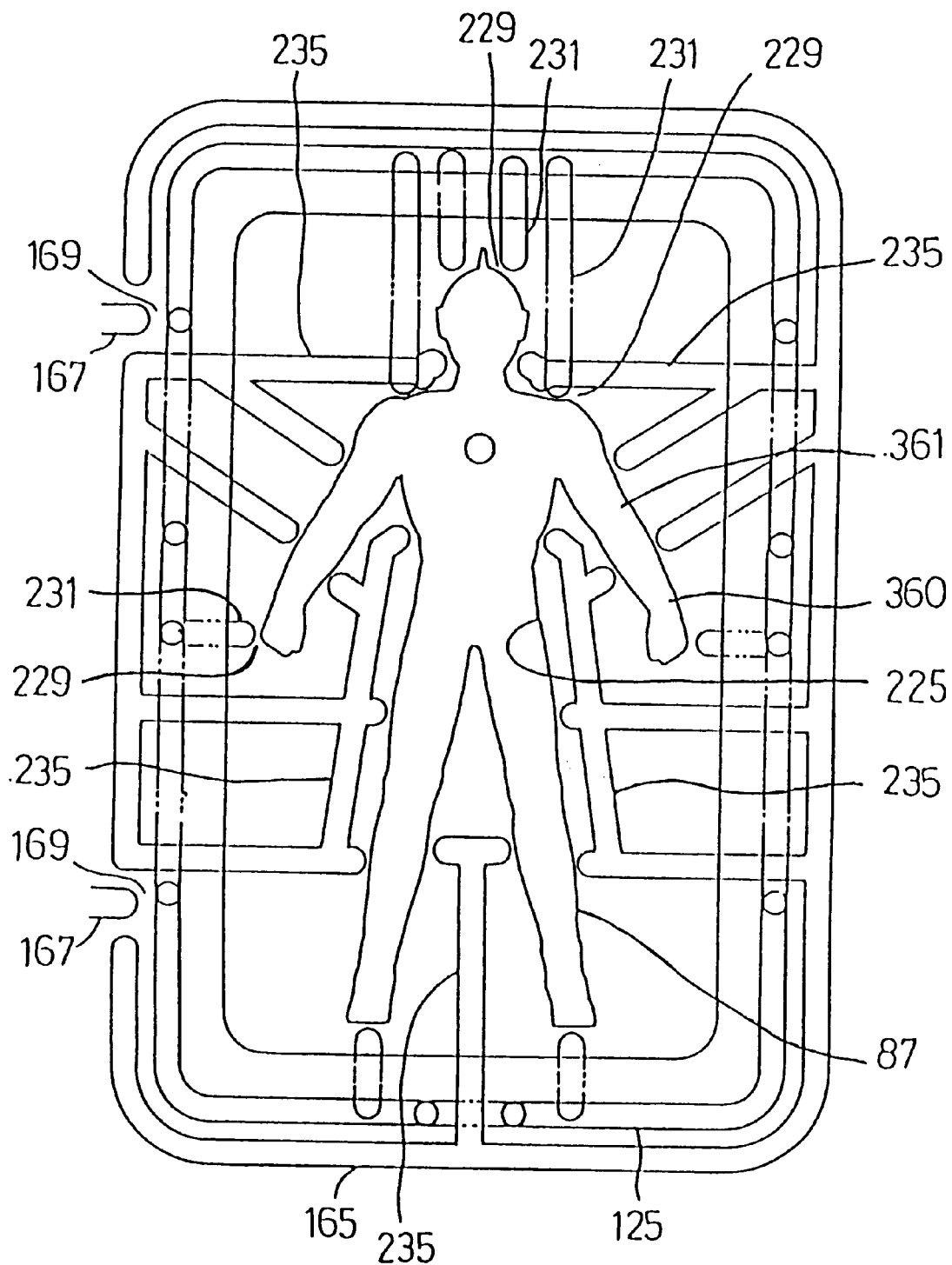
FIG. 9 is a top plan view showing a quaternary mold in the molding apparatus.
Figure 26:
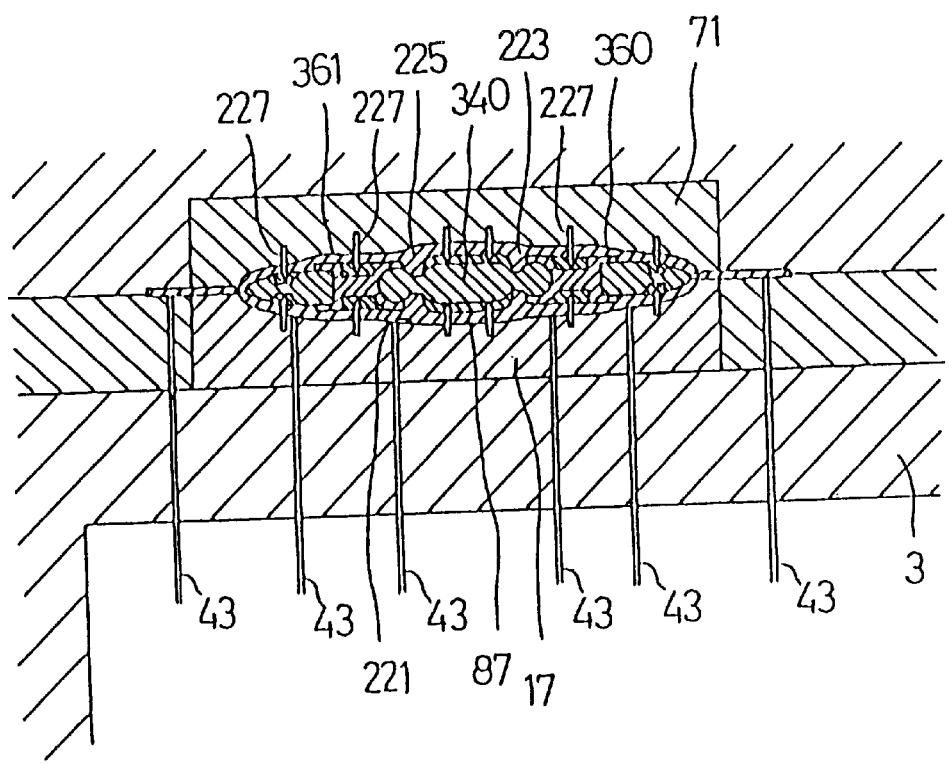
FIG. 26 is a fragmentary sectional view of the quaternary mold.

The fourth movable mold portion 17 has a fourth movable mold recess 221 formed on its front surface, while the fourth stationary mold portion 71 has a fourth stationary mold recess 222 formed on its front surface, as shown in FIGS. 9 and 26. The fourth movable and stationary mold recesses 221 and 222 define a quaternary mold cavity 225 for molding a quaternary product 360 in the quaternary mold 87 formed by the fourth movable and stationary mold portions 17 and 71 joined together.

The quaternary mold cavity 225 is employed for molding a covering member 361 by insert molding about the tertiary product 340 as a whole. Engaging protrusions 227 which are engageable in the holes 191 formed by the protrusions 187 in the flesh portions 341, 343, 345, 347 and 349 are provided as integral or separate parts in the fourth movable and stationary mold recesses 221 and 222.

The fourth stationary mold portion 71 has runner channels 231 formed on its front surface for supplying a third synthetic resin material C into the quaternary mold cavity 225 through gates 229. The runner channels 231 are connected to the runner channels 125 which are connected to the runner channels 167 through the tunnel gates 169.

The fourth movable mold portion 17 has runner securing channels 235 formed on its front surface for mounting and securing runners 223 molded in the runner channels 203. The runner securing channels 235 have recesses 237 for receiving the connecting ends 239 of the runners 223 which are formed at the gates 201 of the runner channels 203. The fourth stationary mold portion 71 has pressing protrusions 241 formed as integral or separate parts on its front surface for cutting off the connecting ends 239 of the runners 223 and forcing them into the recesses 237.

Description will now be made on the operation of the molding apparatus 1 as described above. The movable mold device 3 is secured to the movable side of the injection molding machine W, and the stationary mold device 61 is secured to its stationary side (see FIG. 1). The injection molding machine W has its injection nozzle (not shown) connected to the rear end of the rotary shaft 7 in the movable mold device 3, and has its injection unit not shown, either, but connected to the movable mold device 3 so as to be connected to its runner channels 167.

The injection molding machine W is driven to join the movable mold device 3 with the stationary mold device 61, as shown in FIG. 2. As a result, the first movable mold portion 11 is joined with the first stationary mold portion 65 to define the primary mold 81 and the second movable mold portion 13 is joined with the second stationary mold portion 67 to define the secondary mold 83, while the third movable mold portion 15 is joined with the third stationary mold portion 69 to define the tertiary mold 85 and the fourth movable mold portion 17 is joined with the fourth stationary mold portion 71 to define the quaternary mold 87.

Figure 10:
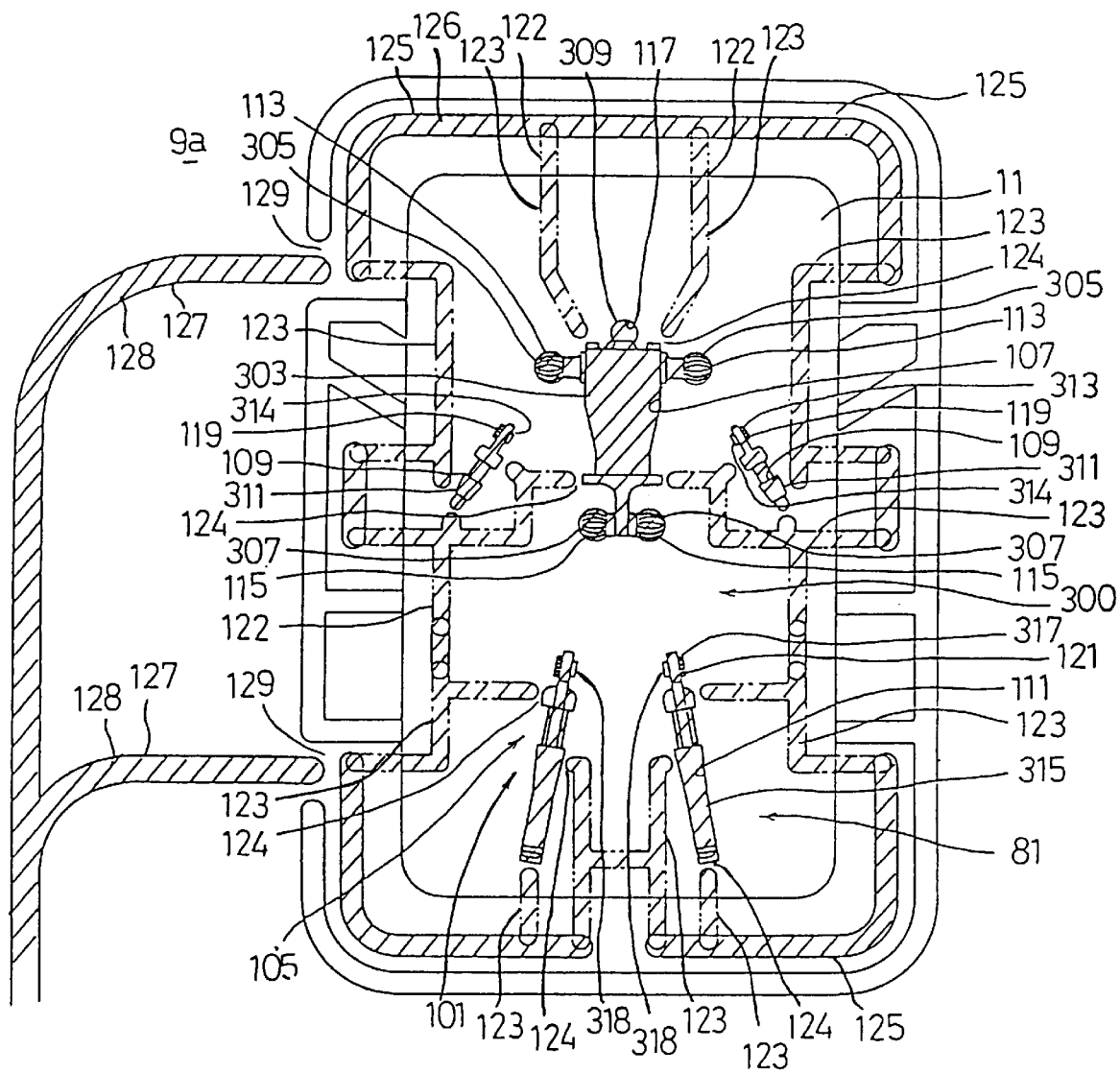
FIG. 10 is a top plan view of the primary mold showing the flow of a synthetic resin material therein.

The first synthetic resin material A is injected from the injection nozzle into the primary mold cavity 105 in the primary mold 81, i.e. the trunk, lower arm and lower leg cavities 107, 109 and 111 through the material supply passage 131 in the rotary shaft 7, the runner channels 127 in the rotary table 9, its tunnel gates 129 and runner channels 125 and the runner channels 123 in the first stationary mold portion 65, as shown in FIG. 10. As a result, the trunk 303 is molded in the trunk cavity 107, the lower arm 311 are molded in the lower arm cavities 109 and the lower legs 315 are molded in the lower leg cavities 111, while the runners 128 are molded in the runner channels 127, the runners 126 are molded in the runner channels 125 and the runners 122 are molded in the runner channels 123.

Figure 30:
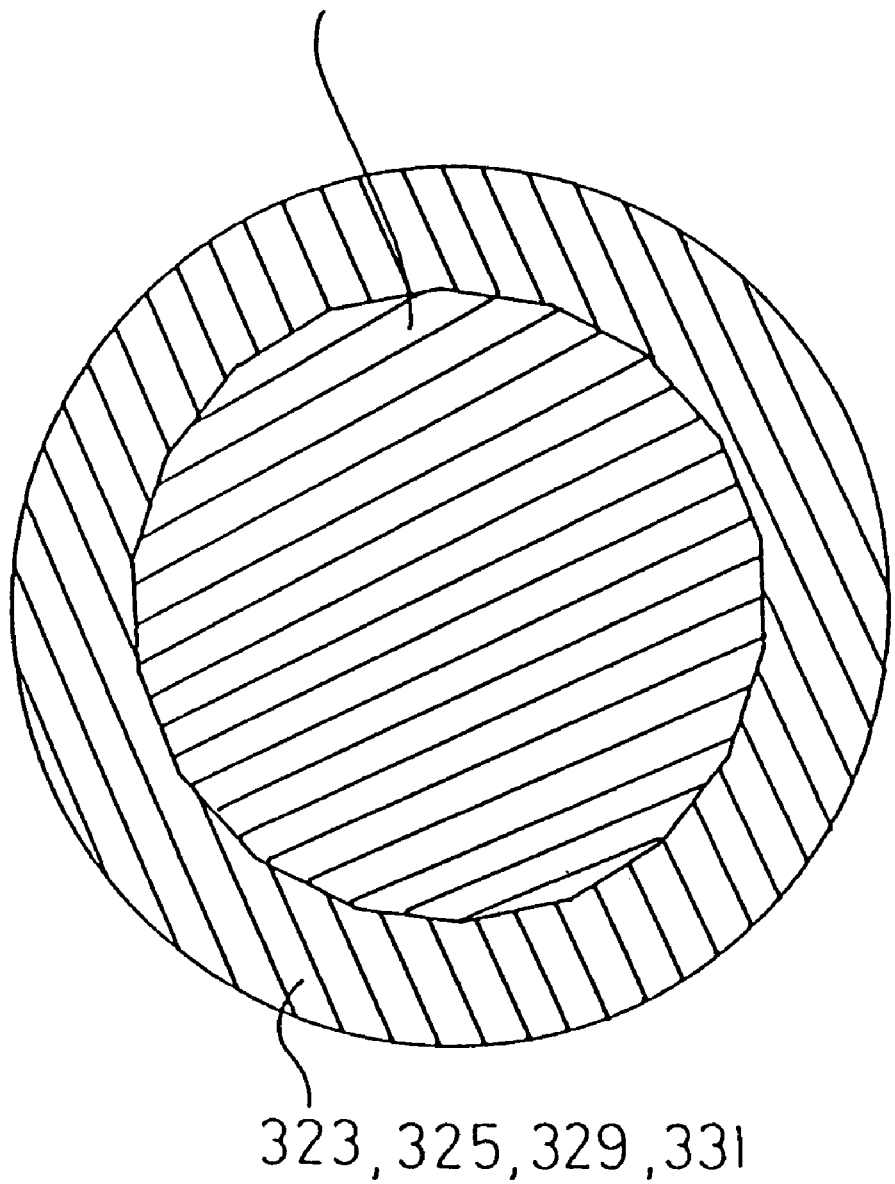
FIG. 30 is a sectional view of a part of the quaternary product.

The generally spherical or polygonal joints 305 each having a substantially polygonal cross section (or an outer surface on which fine protrusions are defined sequently almost its entire periphery) molded in the shoulder joint cavities 113 are formed at the shoulder corners of the trunk 303, as shown in FIGS. 6 and 11 (see FIG. 30). The generally spherical or polygonal joints 307 each having a substantially polygonal cross section (or an outer surface on which protrusions are defined sequently almost its entire periphery) molded in the crotch joint cavities 115 are formed at the crotch end of the trunk 303 (see FIG. 30). The smoothly spherical joint 309 molded in the neck joint cavity 117 is formed at the neck end of the trunk portion 303. The spherical joint 309 may alternatively have a substantially polygonal cross section (or an outer surface on which fine protrusions are defined sequently almost its entire periphery).

The protruding shafts 313 each having a substantially polygonal cross section (or an outer surface on which fine protrusions are defined sequently almost its entire periphery) and the supporting shafts 314 each having a circular cross section as molded in the elbow joint cavity 119 are formed at the elbow ends of the lower arms 311. The protruding shafts 317 each having a substantially polygonal cross section (or an outer surface on which fine protrusions are defined sequently almost its entire periphery) and the supporting shafts 318 each having a circular cross section as molded in the knee joint cavities 121 are formed at the knee ends of the lower legs 315. Although the protruding shafts 313 and 317 have been described as being provided on one side, and the supporting shafts 314 and 318 on the other side, it is, of course, possible to provide the protruding shafts 313 and 317 on both sides. The polygonal cross section as stated above is preferably at least hexagonal.

While the trunk 303, lower arms 311 and lower legs 315 forming a primary product 300 are molded in the primary mold 81 as described above, a secondary, a tertiary and a quaternary products 320, 340 and 360 are simultaneously molded in the secondary, tertiary and quaternary molds 83, 85 and 87, respectively.

If the injection molding machine W is driven to separate the movable mold device 3 from the stationary mold device 61 as shown in FIG. 3, the primary product 300 stays on the movable mold device 3, as shown in FIG. 12. When the drive shafts 47 of the hydraulic cylinders 45 are actuated to move the second base 41 forward, the ejector pins 43 project forward. A part of the ejector pins 43 eject the runners 128, as shown in FIG. 6. The runners 126 are connected to the runners 128 at the tunnel gates 129, but upon ejection of the runners 128, the runners 126 are cut off the runners 128 and only the runners 128 are ejected, as shown in FIG. 12. The ejection of such unnecessary runners by the ejector pins 43 takes place in the secondary, tertiary and quaternary molds 83, 85 and 87, too.

Figure 13:
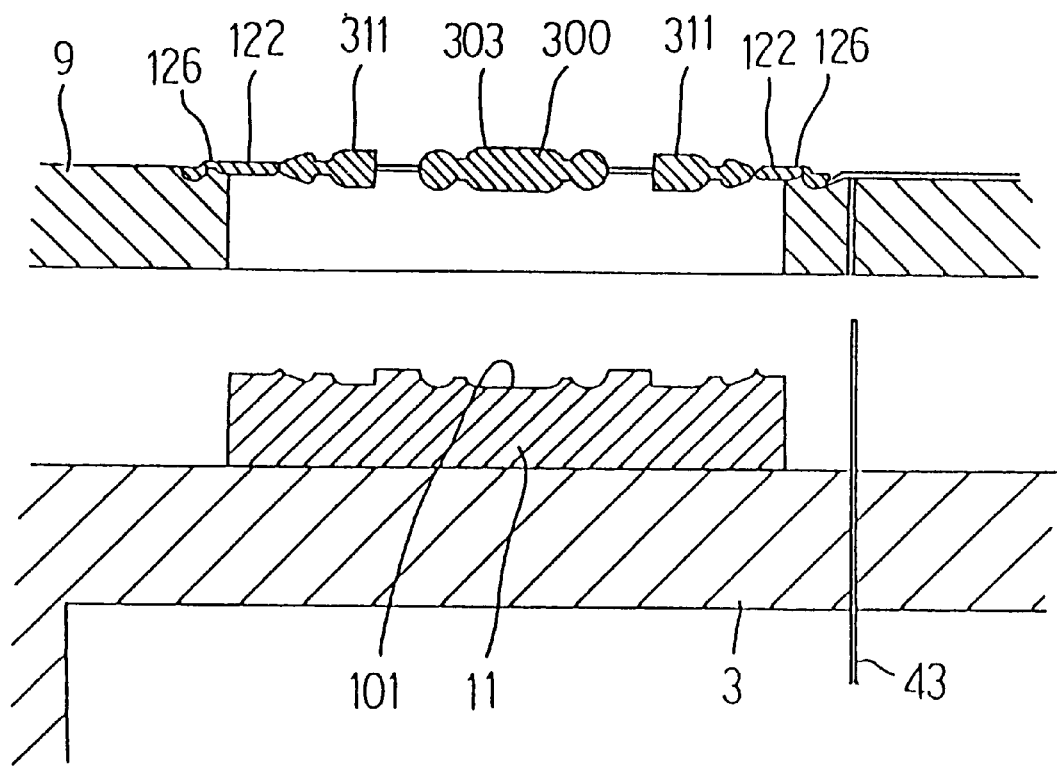
FIG. 13 is a fragmentary sectional view illustrating the operation of the primary mold.

The drive shafts 47 of the hydraulic cylinders 45 are actuated to move back the second base 41 to its original position and thereby the ejector pins 43, and the first base 35 is moved forward, as shown in FIG. 4. The rotary table 9 is moved forward by the rotary shaft 7 and the pusher shafts 39. As a result, the trunk 303, lower arms 311 and lower legs 315 are separated from the first movable mold portion 11 by the runners 122, as shown in FIG. 13, since the runners 126 adhere to the rotary table 9, as shown in FIG. 6.

The hydraulic cylinder not shown is actuated to move the rack 59 to rotate the spur gear 57 and the rotary shaft 7 to rotate the rotary table 9 by an angle of 90 degrees, and the first base 35 is moved back to its original position, whereupon the primary product 300 is placed in the second movable mold recess 133 of the second movable mold portion 13, the secondary product 320 is placed in the third movable mold recess 171 of the third movable mold portion 15, and the tertiary product 340 is placed in the fourth movable mold recess 221 of the fourth movable mold portion 17.

The injection molding machine W is driven to join the movable mold device 3 with the stationary mold device 61, as shown in FIG. 2. The first movable mold portion 11 is joined with the first stationary mold portion 65 to form the primary mold 81 and the second movable mold portion 13 is joined with the second stationary mold portion 67 to form the secondary mold 83. Moreover, the third movable mold portion 15 is joined with the third stationary mold portion 69 to form the tertiary mold 85 and the fourth movable mold portion 17 is joined with the fourth stationary mold portion 71 to form the quaternary mold 87.

The primary product 300 is placed in the secondary mold cavity 135 of the secondary mold 83. The trunk 303 is held in the trunk securing cavity 137, lower arms 311 are held in the lower arm securing cavities 139, and lower legs 315 are held in the lower leg securing cavities 141. The runners 122 are held in the runner securing channels 143 of the third stationary mold portion 69.

Figure 14:
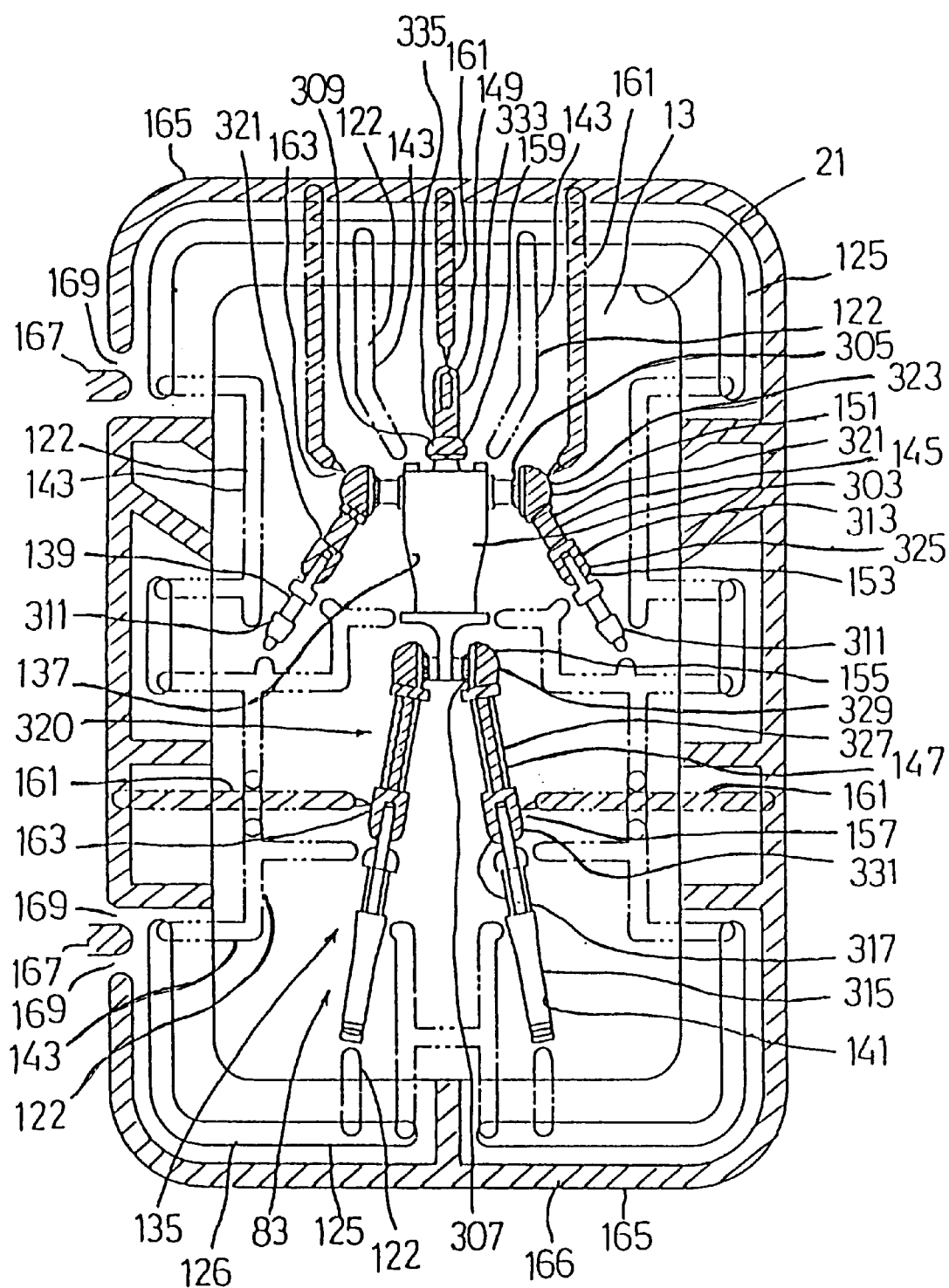
FIG. 14 is a top plan view of the secondary mold showing the flow of a synthetic resin material therein.

The second synthetic resin material B having a melting point lower than that of the first synthetic resin material A used for primary molding is injected from the injection unit not shown in the injection molding machine W into the upper arm, upper leg and skull cavities 145, 147 and 149 through the runner channel 167, tunnel gate 169, runner channels 165 and 161 and tunnel gates 163, as shown in FIG. 14.

As a result, the runner 168 is molded in the runner channel 167, the runners 166 and 162 are molded in the runner channels 165 and 161, the upper arms 321 are molded in the upper arm cavities 145, the upper legs 327 are molded in the upper leg cavity 147, and the skull 333 is molded in the skull cavity 149.

Figure 16:
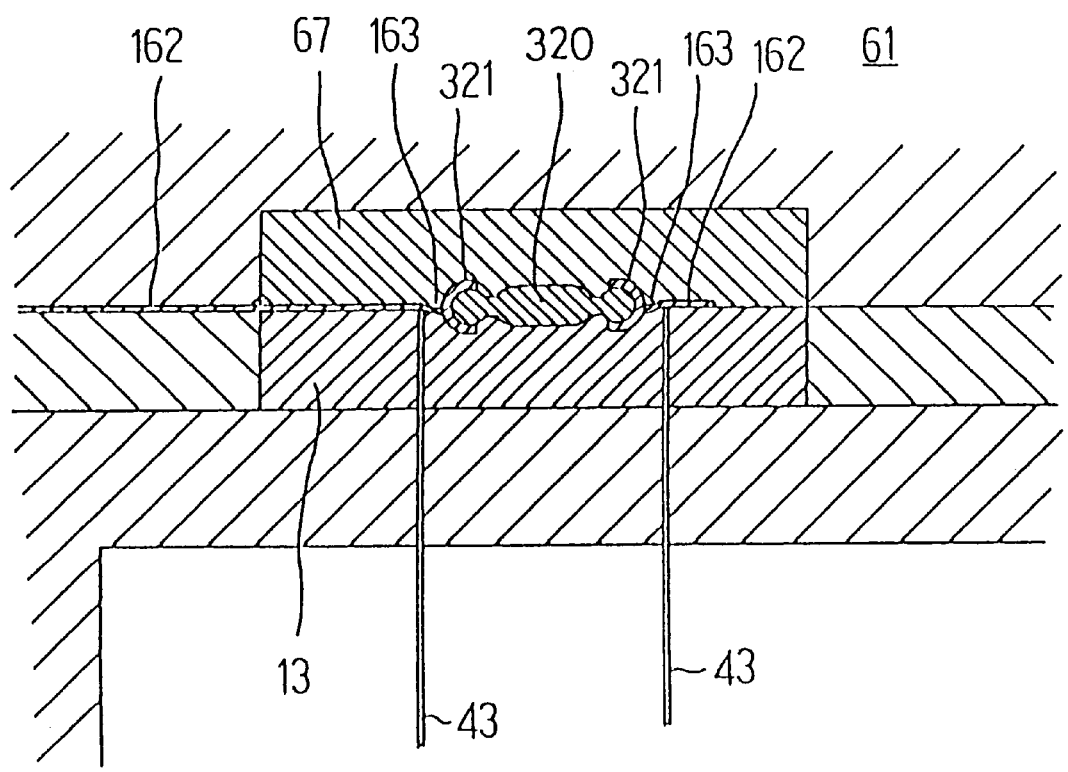
FIG. 16 is fragmentary sectional view of the secondary mold.

Each of the upper arms 321 has a shell 323 formed in the shell cavities 151 and enclosing the generally spherical or polygonal joints 305 of the trunk 303, and bearings 325 formed in the bearing cavities 153 and enclosing the protruding and supporting shafts 313 and 314 of the lower arms 311, as shown in FIGS. 7, 15 and 16. (see FIG. 30) Each of the upper legs 327 has a shell 329 formed in the shell cavities 155 and enclosing the generally spherical or polygonal joints 307 of the trunk 303, and bearings 331 formed in the bearing cavities 157 and enclosing the protruding and supporting shafts 317 and 318 of the lower legs 315. The skull 333 has a shell 335 formed in the shell portion 159 and enclosing the spherical joint 309 of the trunk portion 303.

The secondary product 320 is molded in the secondary mold 83 by having its upper arms 321 joined to the trunk 303 and lower arms 311, its upper legs 327 joined to the trunk 303 and lower legs 315, and its skull 333 joined to the trunk 303, as described above. At the same time, another primary product 300, another tertiary product 340 and another quaternary product 360 are formed in the primary, tertiary and quaternary molds 81, 85 and 87, respectively.

Figure 17:
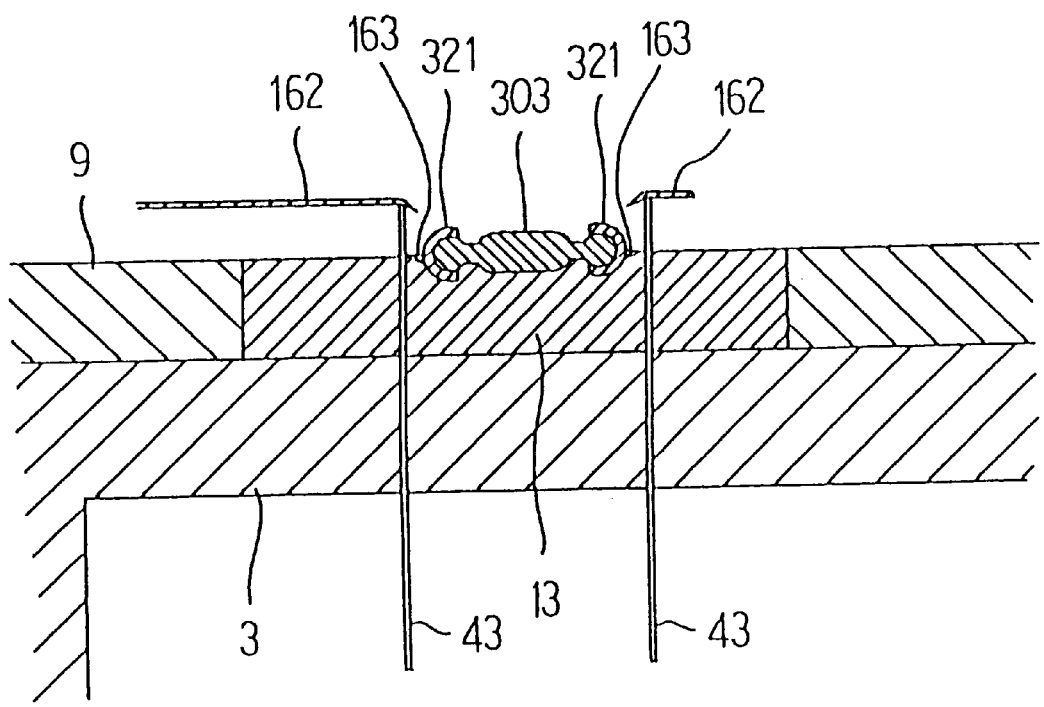
FIG. 17 is a fragmentary sectional view illustrating the operation of the secondary mold.

If the injection molding machine W is driven to separate the movable mold device 3 from the stationary mold device 61, as shown in FIG. 3, the secondary product 320 still stays on the movable mold device 3. If drive shafts 47 of the hydraulic cylinders 45 are actuated to move the second base 41 forward, the ejector pins 43 project forward. A part of the ejector pins 43 eject the runners 162, 166 and 168, as shown in FIG. 7. The runners 162 which are connected to the upper arm 321, upper leg 327 and skull 333 at the tunnel gates 163 are separated therefrom at the tunnel gates 163 when they are ejected, as shown in FIG. 17.

Figure 18:
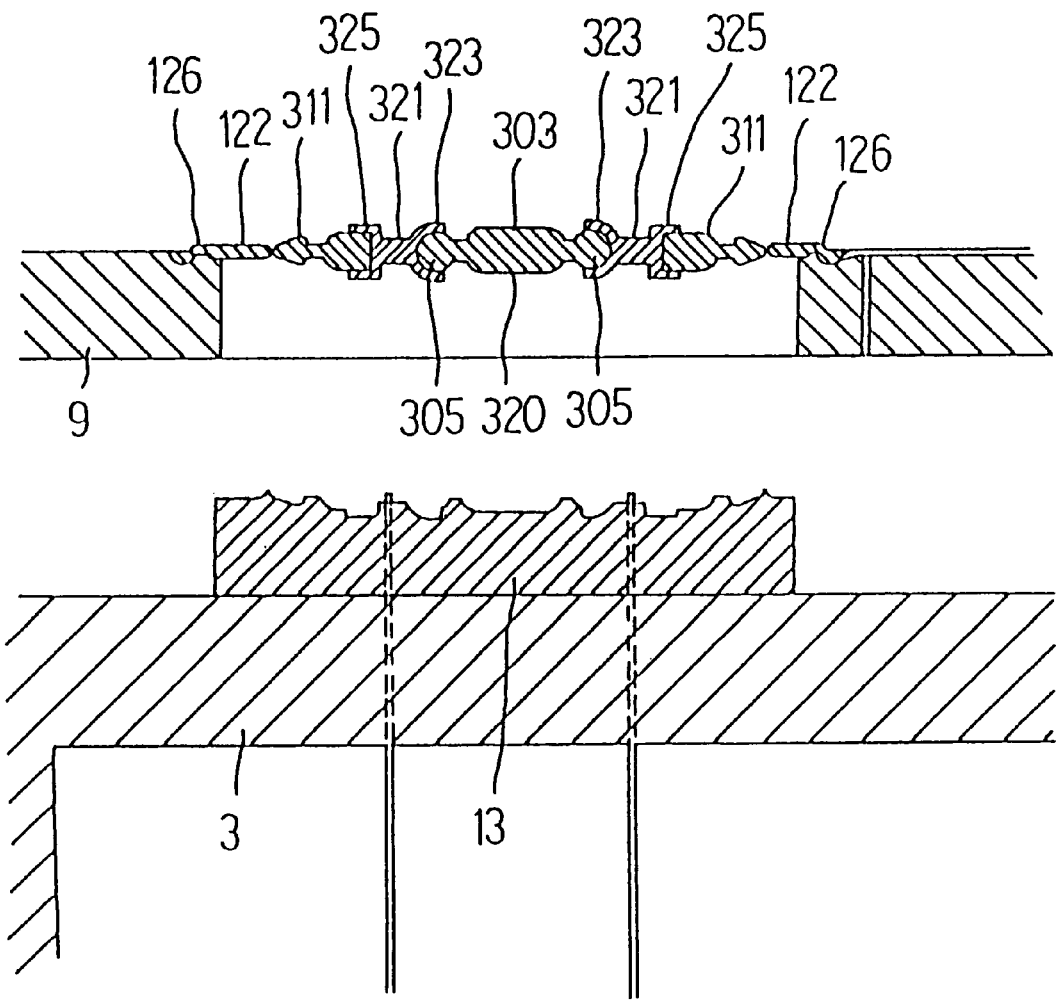
FIG. 18 is a fragmentary sectional view illustrating the operation of the secondary mold.

The drive shafts 47 of the hydraulic cylinders 45 are actuated to move back the second base 41 to its original position and thereby the ejector pins 43, and the first base 35 is moved forward, as shown in FIG. 4. As a result, the rotary table 9 is moved forward by the rotary shaft 7 and the pusher shafts 39. The secondary product 320 is separated from the second movable mold portion 13 by the runners 122, since the runners 126 adhere to the rotary table 9, as shown in FIG. 18.

The hydraulic cylinder not shown is actuated to move the rack 59 to rotate the spur gear 57 and the rotary shaft 7 to rotate the rotary table 9 by an angle of 90 degrees, and the first base 35 is moved back to its original position, whereupon the primary product 300 is placed in the second movable mold recess 133 of the second movable mold portion 13, the secondary product 320 in the third movable mold recess 171 of the third movable mold portion 15, and the tertiary product 340 in the fourth movable mold recess 221 of the fourth movable mold portion 17.

The injection molding machine W is driven to join the movable mold device 3 with the stationary mold device 61, as shown in FIG. 2. The first movable mold portion 11 is joined with the first stationary mold portion 65 to form the primary mold 81 and the second movable mold portion 13 is joined with the second stationary mold portion 67 to form the secondary mold 83. Moreover, the third movable mold portion 15 is joined with the third stationary mold portion 69 to form the tertiary mold 85 and the fourth movable mold portion 17 is joined with the fourth stationary mold portion 71 to form the quaternary mold 87.

The secondary product 320 is placed in the tertiary mold cavity 173 of the tertiary mold 85. The runners 122 are held in the runner securing channels 193 of the third stationary mold portion 69. The runner securing channels 193 have circular recesses 195 formed in the positions corresponding to the connection ends 132 at which the secondary product 320 is connected to the runners 122, as shown in FIG. 21(a), and the third movable mold portion 15 has pressing protrusions 197 formed on its front surface for pressing the connecting ends 132.

When the third movable mold portion 15 is joined with the third stationary mold portion 69, therefore, the pressing protrusions 197 cut off the connecting ends 132 by forcing them into the recesses 195, and the secondary product 320 is, therefore, severed from the runners 122 as soon as it is placed in the tertiary mold cavity 173.

Figure 19:
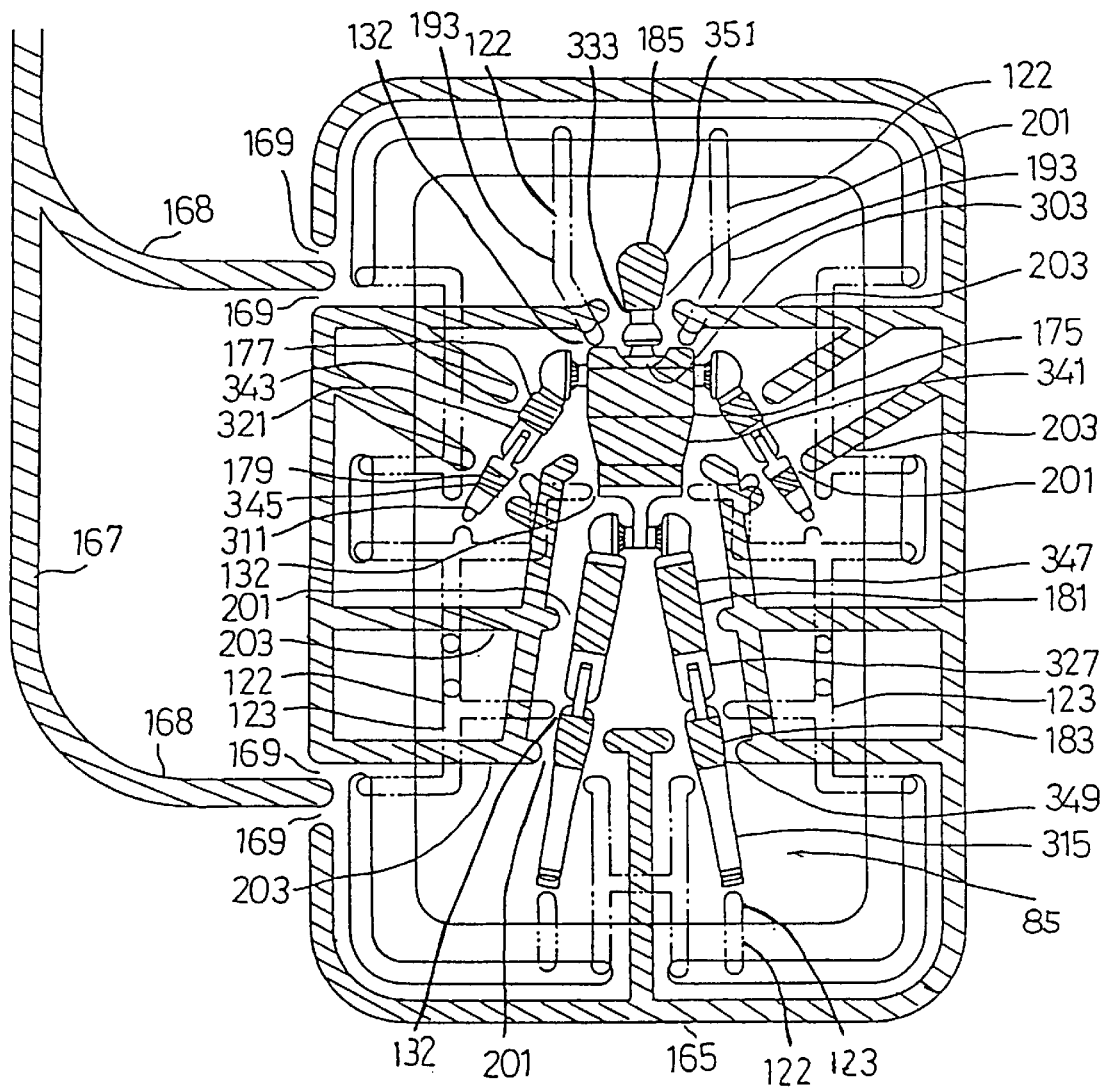
FIG. 19 is a top plan view of the tertiary mold showing the flow of a synthetic resin material therein.

The third synthetic resin material C having a melting point lower than that of the second synthetic resin material B used for secondary molding is injected from the injection unit not shown in the injection molding machine W into the trunk, upper arm, lower arm, upper leg, lower leg and skull flesh cavities 175, 177, 179, 181, 183 and 185 through the runner channels 167, tunnel gates 169, runner channels 165 and 203, and gates 201, as shown in FIG. 19.

Figure 23:
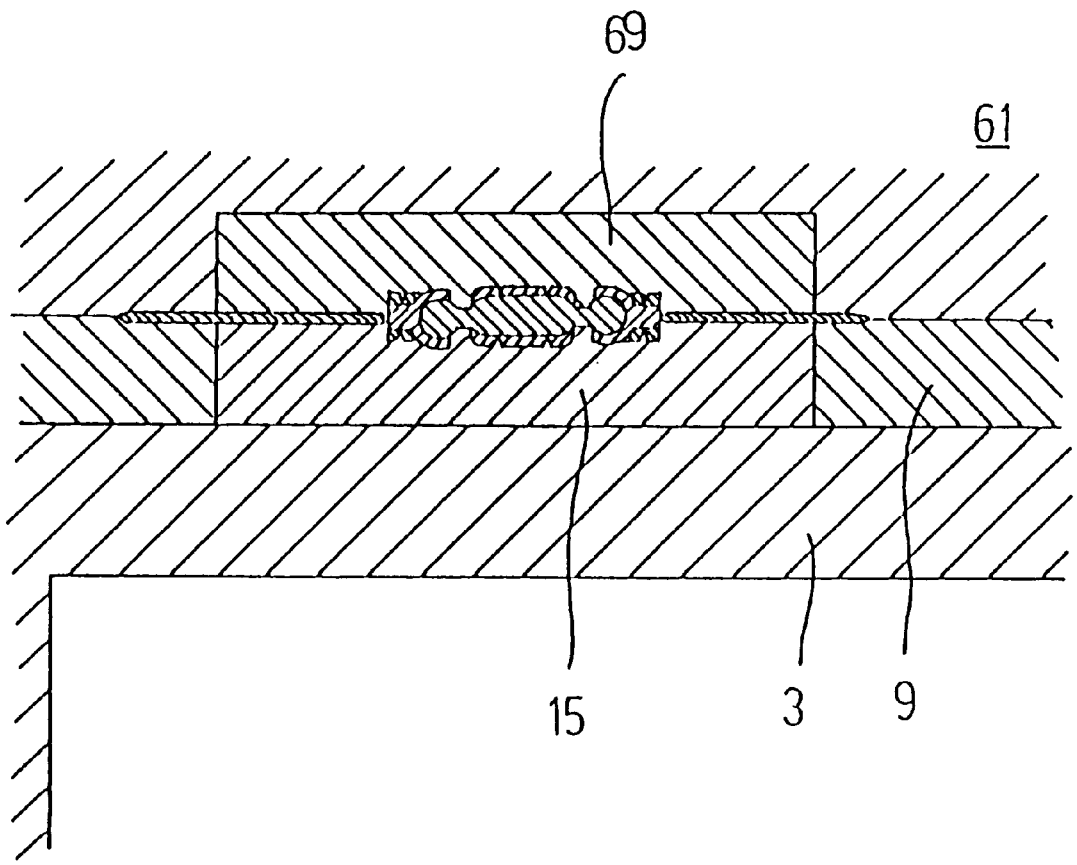
FIG. 23 is a fragmentary sectional view of the tertiary mold.

As a result, the trunk, upper arms, lower arms, upper legs, lower legs and skull flesh portions 341, 343, 345, 347, 349 and 351 are molded in the cavities 175, 177, 179, 181, 183 and 185, while the runners 168 are molded in the runner channels 167, the runners 166 in the runner channels 165, the runners 223 in the runner channels 203, and the connecting ends 239 in the gates 201, as shown in FIGS. 20 and 23.

As the protrusions 187 are provided in the cavities 175, 177, 179, 181, 183 and 185, the holes 191 are formed in the flesh portions 341, 343, 345, 347, 349 and 351 molded in the cavities 175 to 185, as shown in Figure (b) of FIG. 21.

The tertiary product 340 is, thus, molded as a body having "flesh" added to the secondary product 320. At the same time, another primary product 300, another secondary product 320 and another quaternary product 360 are molded in the primary, secondary and quaternary molds 81, 83 and 87, respectively.

If the injection molding machine W is driven to separate the movable mold device 3 from the stationary mold device 61, as shown in FIG. 3, the tertiary product 340 stays on the movable mold device 3. If the drive shafts 47 of the hydraulic cylinders 45 are actuated to move the second base 41 forward, the ejector pins 43 project forward. A part of the ejector pins 43 eject the runners 122, 126 and 168 in FIG. 8.

Figure 22:
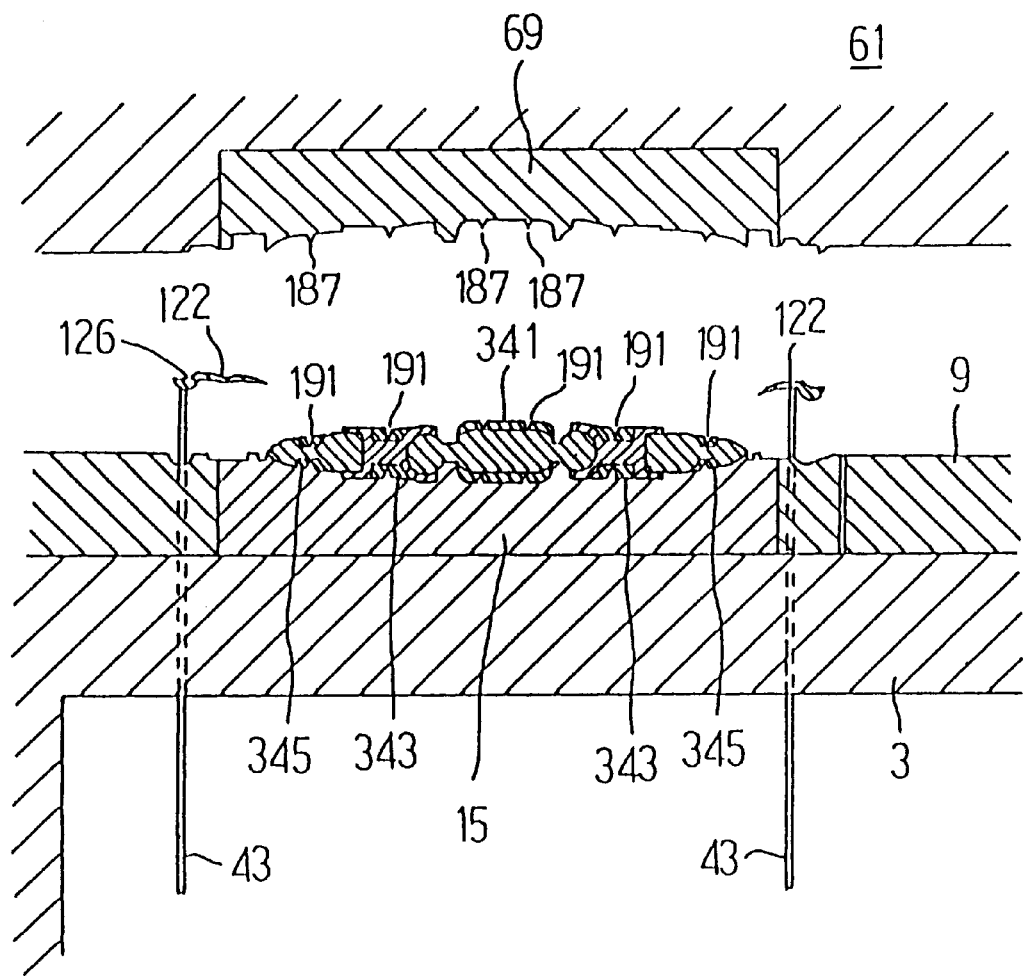
FIG. 22 is a fragmentary sectional view illustrating the operation of the tertiary mold.

Only the runners 122 and 126 can be ejected, as shown in FIG. 22, since the runners 122 have already been cut off the tertiary product 340 by the protrusions 197, as described above.

Figure 24:
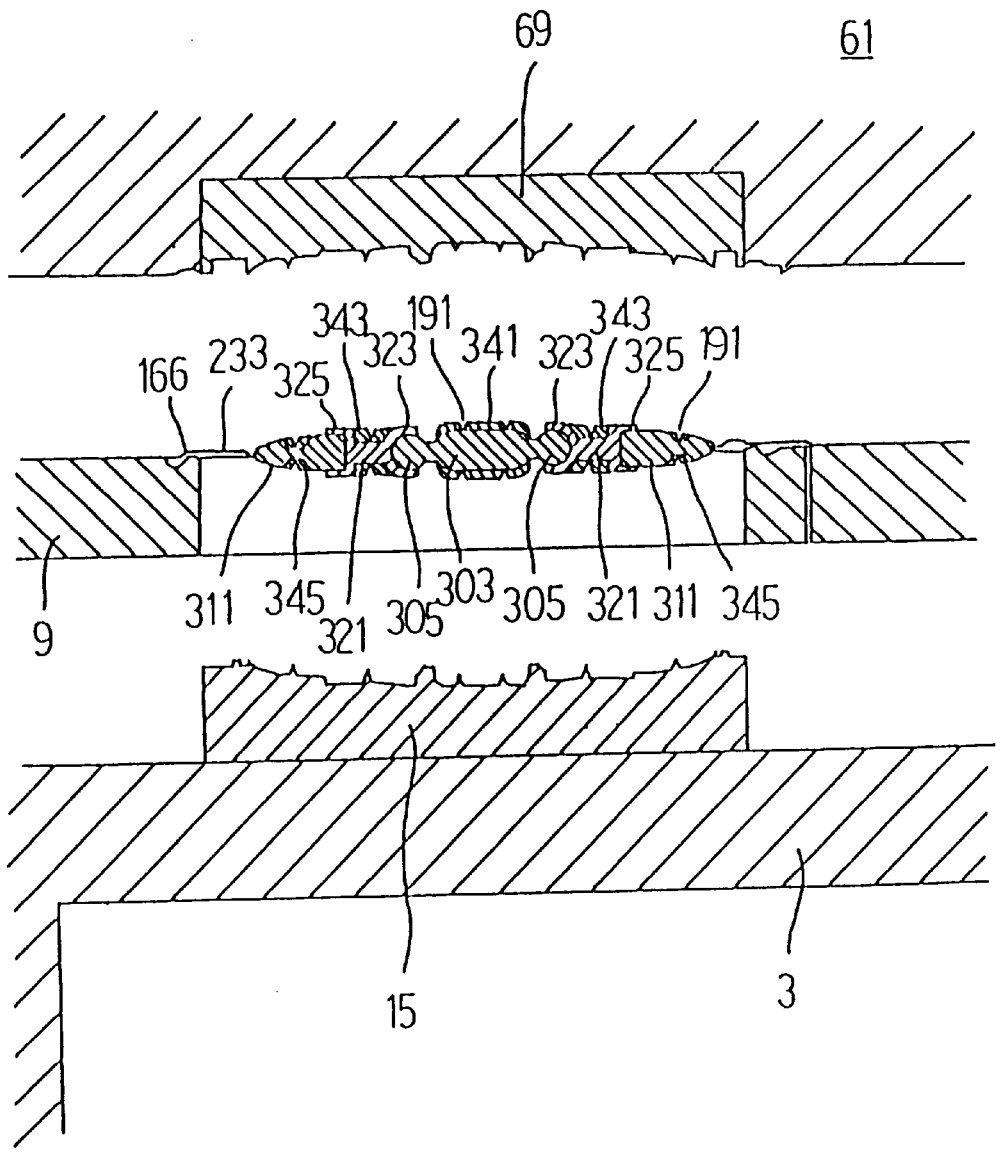
FIG. 24 is a fragmentary sectional view illustrating the operation of the tertiary mold.

The drive shafts 47 of the hydraulic cylinders 45 are actuated to move back the second base 41 to its original position and thereby the ejector pins 43, and the first base 35 is moved forward, as shown in FIG. 4. The rotary table 9 is moved forward by the rotary shaft 7 and the pusher shafts 39. The tertiary product 340 is separated from the third movable mold portion 15 by the runners 233, since the runners 166 adhere to the rotary table 9, as shown in FIGS. 8 and 24.

The hydraulic cylinder not shown is actuated to move the rack 59 to rotate the spur gear 57 and the rotary shaft 7 to rotate the rotary table 9 by an angle of 90 degrees, and the first base 35 is moved back to its original position, whereupon the primary product 300 is placed in the second movable mold recess 133 of the second movable mold portion 13, the secondary product 320 is placed in the third movable mold recess 171 of the third movable mold portion 15, and the tertiary product 340 is placed in the fourth movable mold recess 221 of the fourth movable mold portion 17.

The injection molding machine W is driven to join the movable mold device 3 with the stationary mold device 61, as shown in FIG. 2. The first movable mold portion 11 is joined with the first stationary mold portion 65 to form the primary mold 81 and the second movable mold portion 13 is joined with the second stationary mold portion 67 to form the secondary mold 83. Moreover, the third movable mold portion 15 is joined with the third stationary mold portion 69 to form the tertiary mold 85 and the fourth movable mold portion 17 is joined with the fourth stationary mold portion 71 to form the quaternary mold 87.

Figure 27:
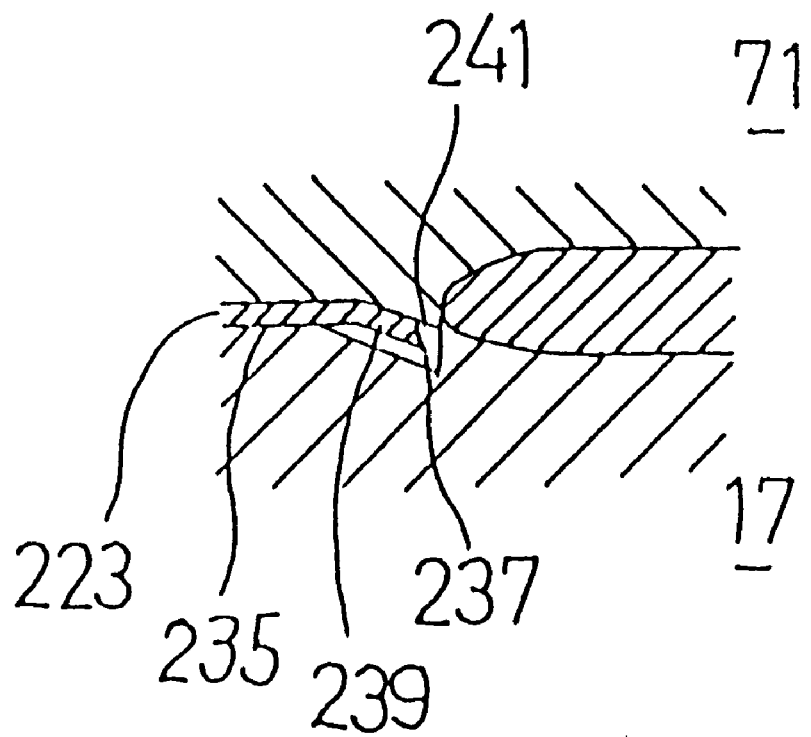
FIG. 27 is a fragmentary enlarged view of the quaternary mold.

The tertiary product 340 is placed in the quaternary mold cavity 225 of the quaternary mold 87. The runners 233 are secured in the runner securing channels 235 of the fourth movable mold portion 17. The protrusions 227 are provided in the quaternary mold cavity 225, and engage in the holes 191 of the tertiary product 340, as shown in FIG. 26. The runner securing channels 235 have the recesses 237 formed in the positions corresponding to the connecting ends 239 at which the tertiary product 340 is connected to the runners 233, as shown in FIG. 27, and the protrusions 241 for pressing the connecting ends 239 are formed on the front surface of the fourth stationary mold portion 71.

If the fourth movable mold portion 17 is joined with the fourth stationary mold portion 71, therefore, the pressing protrusions 241 cut off the connecting ends 239 by forcing them into the recesses 237, and the tertiary product 340 is, therefore, severed from the runners 233 as soon as it is placed in the quaternary mold cavity 225.

Figure 25:
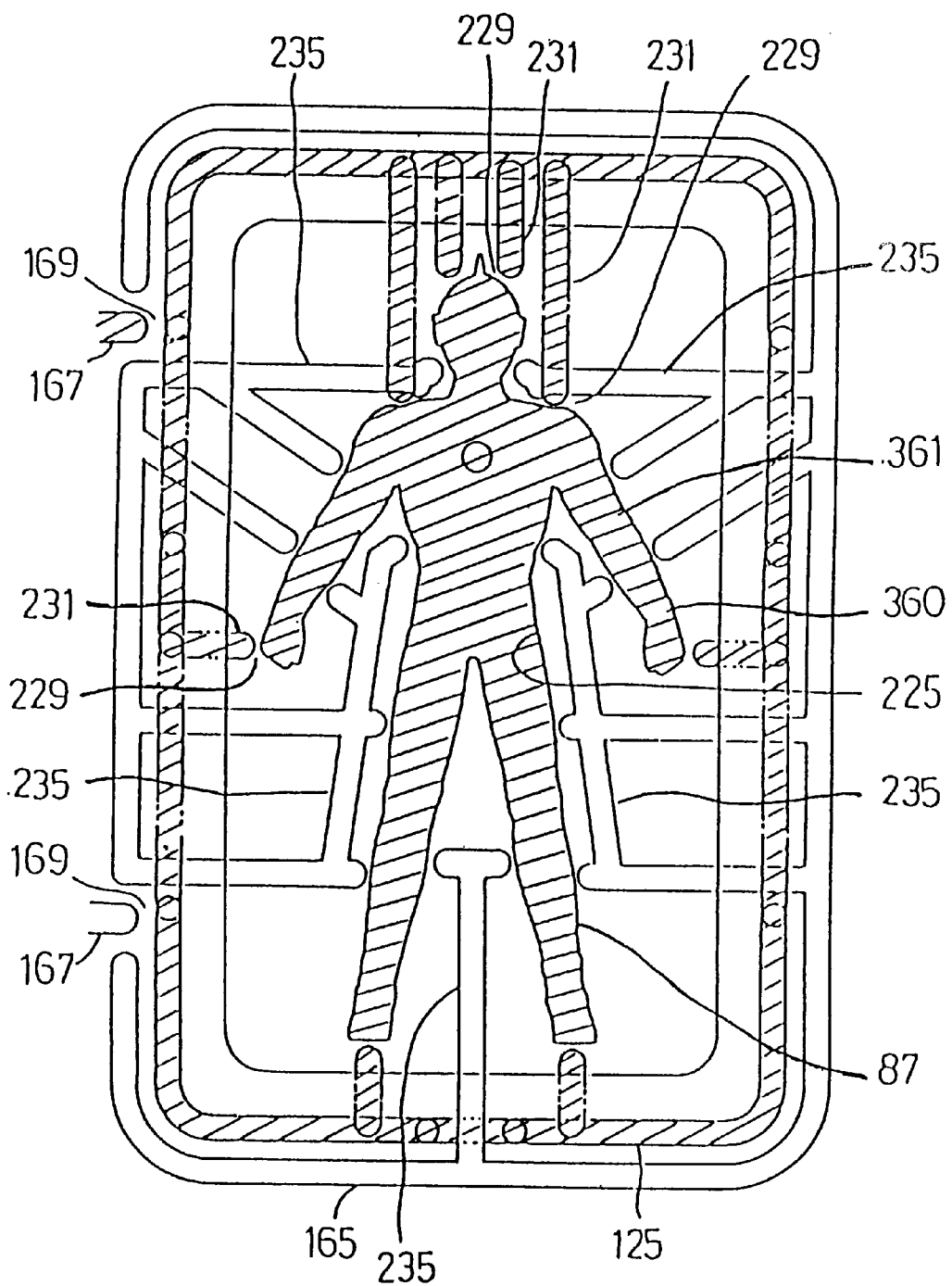
FIG. 25 is a top plan view of the quaternary mold showing the flow of a synthetic resin material therein.

The fourth synthetic resin material D having a melting point lower than that of the third synthetic resin material C used for tertiary molding is injected from the injection unit not shown in the injection molding machine W into the quaternary mold cavity 225 through the runner channels 167, tunnel gates 169, runner channels 125 and 231, and gates 229, as shown in FIG. 25.

Soft vinyl chloride is, for example, used as the fourth synthetic resin material D to make the tertiary product 340 movable. Although this material is so viscous as to otherwise cause the displacement of the tertiary product 340 from its proper position as an insert, the protrusions 227 of the quaternary mold 87 engaging in the holes 191, as shown in FIG. 26, firmly hold the tertiary product 340 against any such displacement.

As a result, the covering member 361 covering the tertiary product 340 is molded in the quaternary mold cavity 225, while the runners 168 are molded in the runner channels 167, the runners 126 are molded in the runner channels 125, and the runners 233 are molded in the runner channels 231.

The quaternary product 360 is molded in the quaternary mold 87 as the covering member 361 covering the tertiary product 340 as a whole. At the same time, another primary product 300, another secondary product 320 and another tertiary product 340 are molded in the primary, secondary and tertiary molds 81, 83 and 85, respectively.

Figure 28:
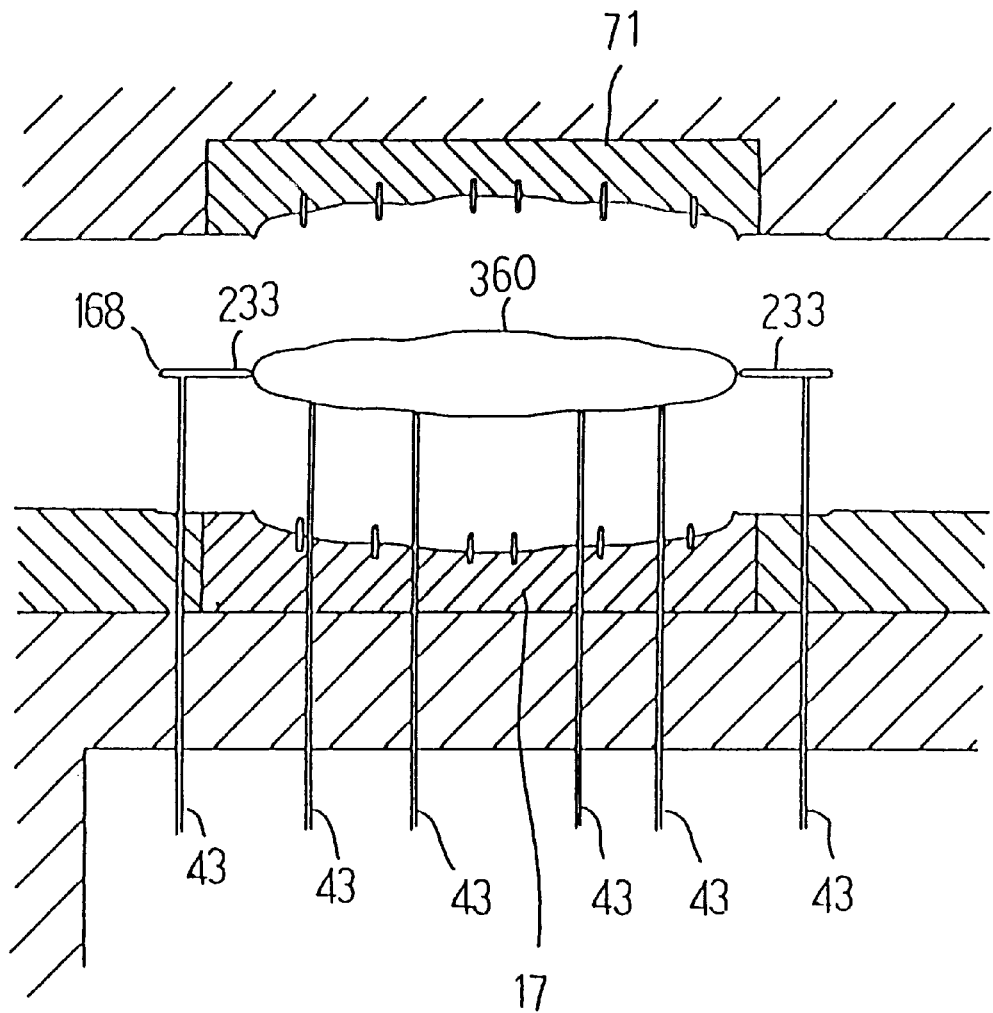
FIG. 28 is a fragmentary sectional view illustrating the operation of the quaternary mold.
Figure 29:
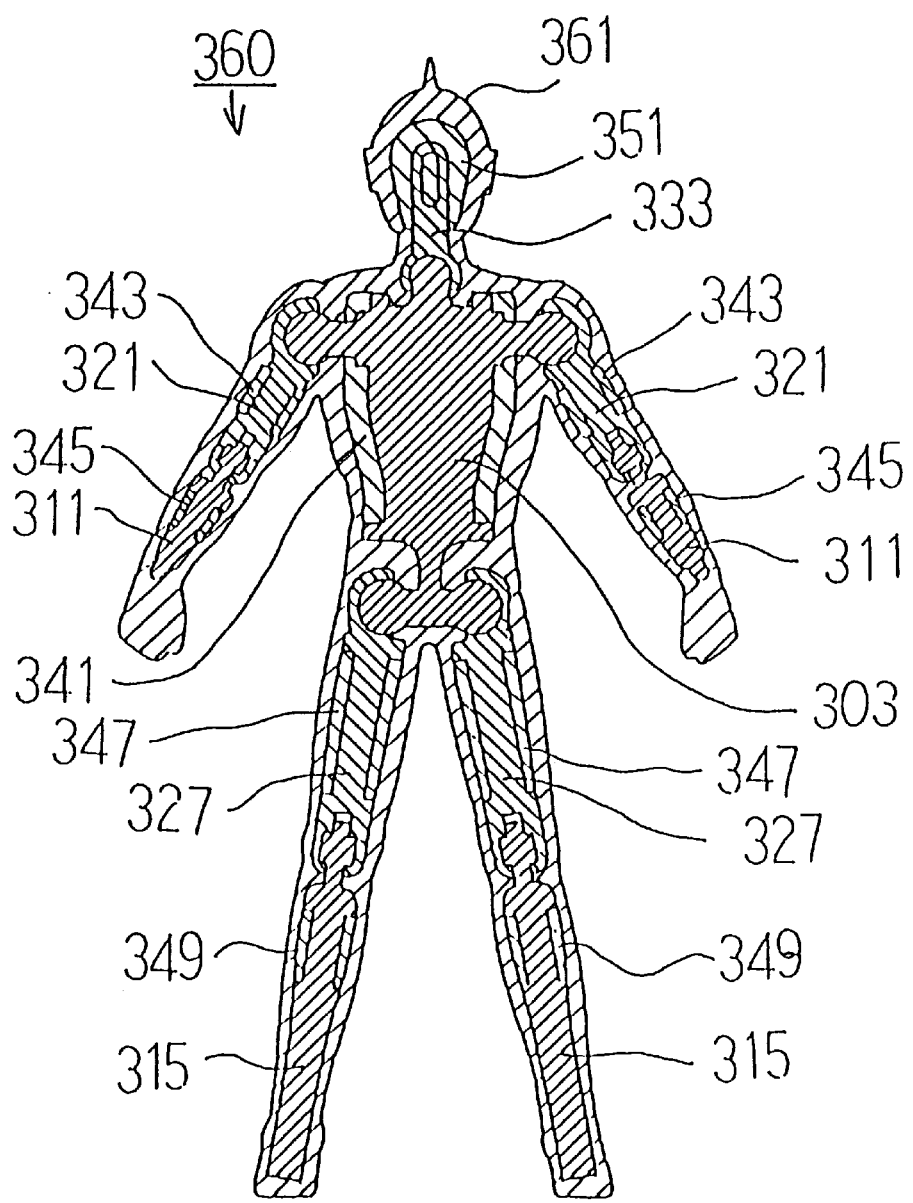
FIG. 29 is a sectional view of a quaternary product.

If the injection molding machine W is driven to separate the movable mold device 3 from the stationary mold device 61 again, as shown in FIG. 3, the quaternary product 360 still stays on the movable mold device 3. The drive shafts 47 of the hydraulic cylinders 45 are actuated to move the second base 41 forward, the ejector pins 43 project forward. A part of the ejector pins 43 eject the quaternary product 360 and the runners 126, 166, 168, 223 and 233 in FIGS. 9 and 28. As the runners 166 and 223 have already been cut off the quaternary product 360 by the protrusions 241, the quaternary product 360 can be obtained in the form in which it is connected to the runners 168 and 233.

The quaternary or final product 360 can be obtained if it is severed from the runners 233. The upper arm 321 in the quaternary product 360 can make a click motion both vertically and horizontally owing to the flexibility of the outer surface of the generally spherical or polygonal joint 305 formed on the trunk 303 and having a substantially polygonal cross section (or an outer surface on which fine protrusions are defined sequently almost its entire periphery), or the flexibility of the inner surface of the shell 323 formed on the upper arm 321 so as to enclose and hold the joint 305 and having a substantially polygonal cross section (or an inner surface which is finely rugged almost its entire periphery).

The upper leg 327 can make a click motion both vertically and horizontally owing to the flexibility of the outer surface of the generally spherical or polygonal joint 307 formed on the trunk 303 and having a substantially polygonal cross section (or an outer surface on which fine protrusions are defined sequently almost its entire periphery), or the flexibility of the inner surface of the shell 329 formed on the upper leg 327 so as to enclose the joint 307 and having a substantially polygonal cross section (or an inner surface which is finely rugged almost its entire periphery).

The lower arm 311 can make a click motion both vertically and horizontally owing to the flexibility of the outer surface of the protruding shaft 313 formed on the lower arm 311 and having a substantially polygonal cross section (or which has fine protrusions defined sequently almost its entire periphery), or the flexibility of the inner surface of the bearing 325 formed on the upper arm 321 so as to enclose the protruding shaft 313 and having a substantially polygonal cross section (or an inner surface which is finely rugged almost its entire periphery).

The lower leg 315 can make a click motion both vertically and horizontally owing to the flexibility of the outer surface of the protruding shaft 317 formed on the lower leg 315 and having a substantially polygonal cross section (or an outer surface which has fine protrusions defined sequently almost its entire periphery), or the flexibility of the inner surface of the bearing 331 formed on the upper leg 327 so as to enclose the protruding shaft 317 and having a substantially polygonal cross section (or an inner surface which is finely rugged almost its entire periphery).

As the quaternary product 360 has the covering member 361 covering the trunk, upper arm, lower arm, upper leg and lower legs 303, 321, 311, 327 and 315, the restoring force of the material of the covering member 361 urges any portion to return to its original position when it is moved as stated above, but as its movement is a click motion, it stays in the position to which it has been moved.

Since the joint assembly of the invention comprises a first member and a second member having an holding portion enclosing a joint portion on the first member as described above, it is possible to use the joint portion of the first member as an insert for molding the second member after molding the first member. During such insert molding, the joint portion of the first member serves as a male die to form the inside of the enclosing portion, and makes it advantageously possible to form the inside of the holding portion in conformity with the shape of the joint portion, however complicated the shape of the joint portion may be. Therefore, if the joint portion is a shaft having an outer surface on which fine protrusions are defined sequently almost its entire periphery, the holding portion is a bearing having an inner surface which is finely rugged almost its entire periphery, and if the joint portion is a spherical body having an outer surface on which fine protrusions are defined sequently almost its entire periphery, the holding portion is a spherical shell having an inner surface which is finely rugged almost its entire periphery, and the joint portion advantageously enables the first and second members to make a click motion.

Since the joint assembly of the invention includes an elastic covering member covering the first and second members, while having the effects as described above, the covering member advantageously makes it difficult for the first and second members to be disconnected from each other.

The process for manufacturing a rotatable joint assembly according to the invention enables the joint assembly to be molded efficiently in a single mold without calling for the use of a plurality of molds which has hitherto been necessary.

Since the process for manufacturing a rotatable joint assembly according to the invention employs the synthetic resin materials having the melting points which become lower from one molding step to another, it is advantageously possible to prevent the molded members molded by the molding steps from being welded to each other.

The movable body of the invention can be manufactured efficiently at a very low cost, since its upper arm is movable with a click relative to its trunk, and its lower arm is movable with a click relative to its upper arm, and since those members can be molded to form a unit.

The movable body of the invention presents a very good outward appearance owing to the covering member which covers its trunk, upper arm and lower arm.

The movable body of the invention can be manufactured efficiently at a very low cost, since its upper leg is movable with a click relative to its trunk portion, and its lower leg is movable with a click relative to its upper leg, and since those members can be molded to form a unit.

The movable body of the invention presents a very good outward appearance owing to the covering member which covers its trunk, upper leg and lower leg.

The process for manufacturing a movable body according to the invention has a very high molding efficiency, since its trunk, upper arm and lower arm can be so molded and joined together in a single mold as to be movable with a click relative to one another.

The process for manufacturing a movable body according to the invention has a high molding efficiency with only a minimum of manual work for assembly as opposed to the prior art, since its trunk, upper arm and lower arm can be so joined together in a single mold as to be movable with a click relative to one another, and can further be covered in its covering member.

The process for manufacturing a movable body according to the invention has a very high molding efficiency, since its trunk, upper leg and lower leg can be so molded and joined together in a single mold as to be movable with a click relative to one another.

The process for manufacturing a movable body according to the invention has a high molding efficiency with only a minimum of manual work for assembly as opposed to the prior art, since its trunk, upper leg and lower leg can be so joined together in a single mold as to be movable with a click relative to one another, and can further be covered in its covering member.

Since the process for manufacturing a movable body according to the invention employs the synthetic resin materials having the melting points which become lower from one molding step to another, it is advantageously possible to prevent the molded members molded by the molding steps from being welded to each other.

Thus, it is seen that joint assembly and a process for manufacturing the same and a movable body and a process for manufacturing the same are provided. One skilled in the art will appreciate that the present invention can be practiced by other than the preferred embodiments which are presented for purpose of illustration, and not of limitation, and the present invention is limited only by the claims which follow.

What is claimed is:

1. A joint assembly comprising:

a first member including an integrally molded joint portion;

a plurality of protrusions formed on an outer surface of said joint portion; and a second member including an integrally molded holding portion having an inner surface rotatably coupled with said plurality of protrusions formed on said outer surface of said joint portion, wherein said first member is movable with respect to said second member.

2. The joint assembly of claim 1 further comprising:

a third member comprising an elastic material covering said first member and said second member.

3. A process for manufacturing a joint assembly comprising:

molding from a first synthetic resin material a first member including an integrally molded joint portion, a plurality of protrusions being formed on an outer surface of said joint portion; and molding from a second synthetic resin material a second member including an integrally molded holding portion having an inner surface rotatably coupled with said plurality of protrusions formed on said outer surface of said joint portion.

4. The process of claim 3 further including the step of:
   molding from a third synthetic resin material a third member covering said first and second members.

5. The process of claim 3 wherein a melting point of said second synthetic resin material is lower than a melting point of said first synthetic resin material.

6. The process of claim 4 wherein a melting point of said third synthetic resin material is lower than a melting point of said second synthetic resin material, and said melting point of said second synthetic resin material is lower than a melting point of said first synthetic resin material.

7. A joint assembly manufactured in accordance with the process of claim 3.

8. A join assembly manufactured in accordance with the process of claim 4.

9. A joint assembly manufactured in accordance with the process of claim 5.

10. A joint assembly manufactured in accordance with the process of claim 6.

* * * * *